US012634280B2

(12) United States Patent
Pokkunuru et al.

(10) Patent No.: US 12,634,280 B2
(45) Date of Patent: May 19, 2026

(54) SYSTEMS AND METHODS FOR PERSON IDENTIFICATION USING WIRELESS SIGNALS

(71) Applicant: Robert Bosch GmbH, Stuttgart (DE)

(72) Inventors: Akarsh Pokkunuru, Charlotte, NC (US); Sirajum Munir, Pittsburgh, PA (US); Michael Mikusch, Munich (DE); Philip Koene, Munich (DE)

(73) Assignee: Robert Bosch GmbH (DE)

( * ) Notice: Subject to any disclaimer, the term of this patent is extended or adjusted under 35 U.S.C. 154(b) by 14 days.

(21) Appl. No.: 18/772,494

(22) Filed: Jul. 15, 2024

(65) Prior Publication Data

US 2026/0019418 A1 Jan. 15, 2026

(51) Int. Cl.
H04L 9/40 (2022.01)
H04W 24/02 (2009.01)

(52) U.S. Cl.
CPC ......... H04L 63/0861 (2013.01); H04W 24/02 (2013.01)

(58) Field of Classification Search
CPC ........................... H04L 63/0861; H04W 24/02
See application file for complete search history.

(56) References Cited

U.S. PATENT DOCUMENTS

| | | | |
|---|---|---|---|
| 2018/0307893 A1* | 10/2018 | Goldberg | H04W 12/06 |
| 2022/0124154 A1* | 4/2022 | Zou | H04B 1/38 |
| 2023/0209325 A1* | 6/2023 | Lee | G06N 3/09 |
| | | | 370/338 |

FOREIGN PATENT DOCUMENTS

| | | | |
|---|---|---|---|
| JP | 2024052104 A | * | 4/2024 |

OTHER PUBLICATIONS

Kaiming He et al., "Deep Residual Learning for Image Recognition." CVPR 2016, pp. 770-778.
Jie Hu et al., "Squeeze-and-Excitation Networks." CVPR 2018, pp. 7132-7141.

* cited by examiner

*Primary Examiner* — Joe Chacko
(74) *Attorney, Agent, or Firm* — Dickinson Wright PLLC

(57) ABSTRACT

Systems and methods for person identification using wireless signals is disclosed. Channel state information is collected from wireless signals received by a wireless receiver. The channel state information (CSI) is pre-processed to determine a gait and biometric features including body shape and height associated with a particular person based on selected CSI segments, which are annotated with a class indicative of the gait. The particular person is identified, using a machine learning model, based on the gait and the other biometric features, wherein the machine learning model is trained using classifier training and training data including the gait and information from the CSI segments, from which one or more parameters is determined. After training, the person can be identified based on packets from received wireless signals. The method further includes controlling a machine, in response to detecting the presence of the person, based on established usage patterns.

19 Claims, 13 Drawing Sheets

SYSTEMS AND METHODS FOR PERSON IDENTIFICATION USING WIRELESS SIGNALS

TECHNICAL FIELD

The present disclosure relates to personal identification, and more particularly, to identification of a person using wireless signals.

BACKGROUND

Person identification (PID) is the process of recognizing and verifying an individual's identity. Applications in this field includes security and access control to authentication in various domains. Methods such as facial recognition, fingerprint reading, voice authentication, and retina verification offer a biometric approach for using biometric data to verify a person's identity. Furthermore, such methods utilize physical interactions between the system and the person being identified.

SUMMARY

Systems and methods for person identification using wireless signals is disclosed. In one embodiment, a method for person identification includes collecting, at a wireless receiver, channel state information from received packets transmitted by a wireless transmitter. The method further includes pre-processing, using a computer system associated with the wireless receiver, the channel state information, wherein pre-processing the channel state information comprises determining a gait, other biometric features associated with a particular person, e.g., body shape, height, etc. based on selected segments of the channel state information and annotating, using the computer system, the selected channel state information segments with a class indicative based on the at least the gait of the particular person. The method further includes identifying, using a machine learning model, the particular person based on the at least the gait of the particular person, and other biometric features including body shape, heights, etc. wherein the machine learning model is trained using classifier training and training data comprising information from the selected channel state information segments and the gait of the particular person, and wherein performing the classifier training includes determining one or more parameters of the selected channel state information segments, and determining, using the computer system and the machine learning model, one or more usage patterns of a machine by the particular person, wherein the machine is located in the space that includes the wireless receiver and the wireless transmitter. Subsequent to the classifier training, the method includes identifying, using the computer system and the one or more parameters of the selected channel state information segments, a presence of the particular person based on additional packets received by the wireless receiver subsequent to performing classifier training and controlling, by the computer system and using the one or more usage patterns, operation of the machine in response to detecting the presence of the particular person.

A second embodiment is directed to a system for determining particular personal identity using wireless signals. The system includes a wireless receiver configured to receive packets transmitted by a wireless transmitter, and further configured to collect channel state information from the packets and a computer system associated with the wireless receiver. The computer system is configured to pre-process the channel state information, wherein pre-processing the channel state information comprises determining a gait and other biometric features like body shape, height, etc. associated with a particular person based on selected channel state information segments, annotate the selected channel state information segments with a class indicative based on the at least the gait of the particular person and other biometric features like body shape, height, etc., identify, using a machine learning model, the particular person based on the at least the gait of the particular person and other biometric features like body shape, height, etc., wherein the machine learning model is trained using classifier training and training data comprising information from the selected channel state information segments and the gait of the particular person, and wherein the computer system is configured to, in performing the classifier training, determine one or more parameters of the selected channel state information segments, and determine, using machine learning model, one or more usage patterns of a machine by the particular person, wherein the machine is located in a space that includes the wireless receiver and the wireless transmitter. Thereafter, the computer system is configured to identify, using the one or more parameters of the selected channel state information segments, a presence of the particular person based on additional packets received by the wireless receiver subsequent to performing classifier training, and control, using the one or more usage patterns, operation of the machine in response to detecting the presence of the particular person.

A third embodiment is directed to a non-transitory computer-readable medium storing instructions that, when executed by a computer system, cause the computer system to carry out various operations. The operations includes pre-processing channel state information from packets received at a wireless receiver associated with the computer system, wherein pre-processing the channel state information comprises determining a gait and other biometric features like body shape, height, etc. associated with a particular person based on selected channel state information segments, annotating the selected channel state information segments with a class indicative based on the at least the gait of the particular person, identifying, using a machine learning model, the particular person based on the at least the gait of the particular person and other biometric features like body shape, height, etc., wherein the machine learning model is trained using classifier training and training data comprising information from the selected channel state information segments and the gait of the particular person, and wherein performing the classifier training includes determining one or more parameters of the selected channel state information segments and determining, using the machine learning model, one or more usage patterns of a machine by the particular person, wherein the machine is located in a space that includes the wireless receiver and a wireless transmitter from which the packets were transmitted. The operations further include identifying, using the one or more parameters of the selected channel state information segments, a presence of the particular person based on additional packets received by the wireless receiver subsequent to performing classifier training and controlling, using the one or more usage patterns, operation of the machine in response to detecting the presence of the particular person.

DETAILED DESCRIPTION

Figure 1:
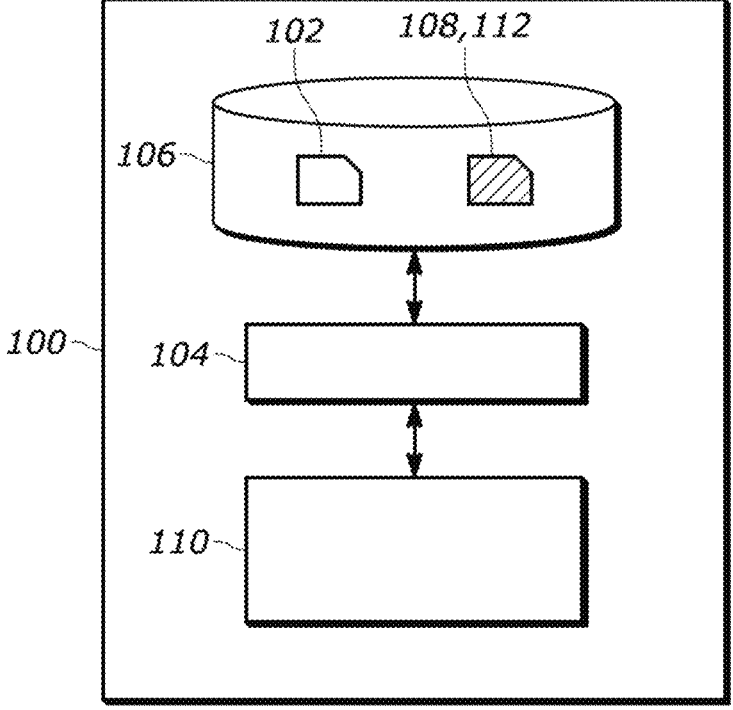
FIG. 1 shows a system 100 for training a neural network.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative bases for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical application. Various combinations and modifications of the features consistent with the teachings of this disclosure, however, could be desired for particular applications or implementations.

"A", "an", and "the" as used herein refers to both singular and plural referents unless the context clearly dictates otherwise. By way of example, "a processor" programmed to perform various functions refers to one processor programmed to perform each and every function, or more than one processor collectively programmed to perform each of the various functions.

Personal identification, or PID, is the process of uniquely recognizing and verifying the identity of an individual. It is a field having applications ranging from security and access control to authentication in various domains. Typically, PID involves using various data sources such as biometric, facial, audio data, facial recognition, fingerprint reading, voice authentication and eye-retina verification technologies to positively identify a person. Although these technologies offer a robust approach to verify human identity, they can be highly invasive to human privacy. The risk of data theft, misuse, and spoofing is still a concern. The user must also go through some inconvenience while interacting with the authentication systems by being in their close vicinity.

In comparison to these methods, wireless signal-based person identification methods are seamlessly convenient while still being secure. Such methods operate in a wide area by using multi-path radio signals which propagate in all directions. This enables high freedom and signal coverage for human identification even if the user is not within a small sensing zone. In addition, wireless signal based PID systems may preserve privacy, as the signals containing identifiable signatures are influenced by the environment and may be confined only to that sensing zone. Whereas traditional identifiable information such as fingerprint data remains static once captured (which may increase the risk of theft), whereas wireless signals vary in spatial-temporal domains, meaning that the wireless bio-metric data may not be useful in a different environment to identify the same person. Thus, wireless signal-based identification systems may be highly convenient and safe.

Wireless-based PID systems may also be useful for personalized content delivery. Prior systems may be unable to automatically detect human presence and identify a person in the vicinity, but instead deliver content based on either proactive human requests or time-of-the-day event-based systems. While such a system may be useful for certain daily routines, a change in a routine may render the system to be unhelpful for that user. However, using wireless PID in accordance with the present disclosure for smart assistant systems may enable human presence detection and identification to deliver personalized content when after a person has been identified. For example, a smart home appliance such as a smart coffee machine could automatically detect the presence of a particular person and dispense coffee made based on personal preferences. In another example, a smart thermostat system could adjust the desired temperature based on the presence of the particular person. Accordingly, this mechanism for PID may enable learning-based home appliances. Beyond home appliances, wireless PID may enable the use of smart machines for, e.g., industrial use or in other workplaces, and a variety of other uses in which a machine may be controlled based on personal usage patterns and/or personal preferences.

In addition to the above, the wireless PID systems of the present disclosure may also provide coarse identification and perform functions based thereon. For example, a wireless PID system according to the disclosure may determine whether a detected person is an adult or a child, and may restrict access to some home appliances (e.g., a stove, an oven, etc.) based thereon.

The wireless PID systems and methods of the present disclosure are privacy preserving and non-invasive and may implemented in a variety of embodiments. In one embodiment, the method may utilize an existing Wi-Fi transmitter (e.g., a home Wi-Fi router) and a wireless receiver configured to receive wireless signals transmitted by the transmitter. The wireless receiver may be, e.g., integrated into a home appliance or security system, and may continuously monitor wireless signals conveyed from the transmitter. These wireless signals may be reflected and/or partially absorbed by a human in the vicinity of a path between the transmitter and the receiver. The receiver may, through the reception of the wireless signals, capture information regarding the gait and other motion signatures/characteristics (e.g., walking patterns). In particular, since human gait may be unique to each individual due to differences in body shape, muscle, and fat tissue, the systems and methods of the present disclosure can learn, via the use of a neural network, to identify people. The neural network can learn other biometric features including height, body shape, etc. Furthermore, the systems and methods disclosed herein may detect activity and patterns thereof for identified persons. Using artificial intelligence and neural networks, the systems and methods disclosed herein may use Wi-Fi channel state information (CSI) features for various personal to solve a multi-class classification task. The methodology may further be extended with other wireless techniques, such as Bluetooth, Ultra Wideband (UWB), LTE, 5G, 6G, and so on, and is thus not limited solely to Wi-Fi implementations. It can also work with multiple antennas.

In various embodiments, the workflow for one embodiment of a method according to the disclosure includes 1) wireless sensing and data collection; 2) data preprocessing; 3) an annotation process; 4) classifier training; 5) inference; and 6) actuation. Various embodiments are now discussed in further detail below.

FIG. 1 shows a system 100 for training a neural network, e.g., a deep neural network. The neural network or deep neural networks shown and described are merely examples of the types of machine learning networks or neural networks that can be used. The system 100 may comprise an input interface for accessing training data 102 for the neural network. For example, as illustrated in FIG. 1, the input interface may be constituted by a data storage interface 104 which may access the training data 102 from a data storage 106. For example, the data storage interface 104 may be a memory interface or a persistent storage interface, e.g., a hard disk or an SSD interface, but also a personal, local or wide area network interface such as a Bluetooth, Zigbee or Wi-Fi interface or an Ethernet or fiber optic interface. The data storage 106 may be an internal data storage of the system 100, such as a hard drive or SSD, but also an external data storage, e.g., a network-accessible data storage.

In some embodiments, the data storage 106 may further comprise a data representation 108 of an untrained version of the neural network which may be accessed by the system 100 from the data storage 106. It will be appreciated, however, that the training data 102 and the data representation 108 of the untrained neural network may also each be accessed from a different data storage, e.g., via a different subsystem of the data storage interface 104. Each subsystem may be of a type as is described above for the data storage interface 104. In other embodiments, the data representation 108 of the untrained neural network may be internally generated by the system 100 on the basis of design parameters for the neural network, and therefore may not explicitly be stored on the data storage 106. The system 100 may further comprise a processor subsystem 110 which may be configured to, during operation of the system 100, provide an iterative function as a substitute for a stack of layers of the neural network to be trained. Here, respective layers of the stack of layers being substituted may have mutually shared weights and may receive as input an output of a previous layer, or for a first layer of the stack of layers, an initial activation, and a part of the input of the stack of layers. The processor subsystem 110 may be further configured to iteratively train the neural network using the training data 102. Here, an iteration of the training by the processor subsystem 110 may comprise a forward propagation part and a backward propagation part. The processor subsystem 110 may be configured to perform the forward propagation part by, amongst other operations defining the forward propagation part which may be performed, determining an equilibrium point of the iterative function at which the iterative function converges to a fixed point, wherein determining the equilibrium point comprises using a numerical root-finding algorithm to find a root solution for the iterative function minus its input, and by providing the equilibrium point as a substitute for an output of the stack of layers in the neural network. The system 100 may further comprise an output interface for outputting a data representation 112 of the trained neural network, this data may also be referred to as trained model data 112. For example, as also illustrated in FIG. 1, the output interface maybe constituted by the data storage interface 104, with said interface being in these embodiments an input/output ('IO') interface, via which the trained model data 112 may be stored in the data storage 106. For example, the data representation 108 defining the 'untrained' neural network may during or after the training be replaced, at least in part by the data representation 112 of the trained neural network, in that the parameters of the neural network, such as weights, hyper parameters and other types of parameters of neural networks, may be adapted to reflect the training on the training data 102. This is also illustrated in FIG. 1 by the reference numerals 108, 112 referring to the same data record on the data storage 106. In other embodiments, the data representation 112 may be stored separately from the data representation 108 defining the 'untrained' neural network. In some embodiments, the output interface may be separate from the data storage interface 104, but may in general be of a type as described above for the data storage interface 104.

In various embodiments, the system for training a neural network may be implemented in a system for determining personal identification using wireless signals (e.g., Wi-Fi) received at a wireless receiver. The data (e.g., CSI) obtained from the wireless signals may be used to determine the gait and/or other motion characteristics to identify a particular person. Embodiments in which the data may also be used for a more coarse identification (e.g., to distinguish between an adult and a child) using the system for training a neural network are also possible and contemplated. The system may be implemented in a home appliance, industrial equipment, or any other suitable environment. Based on the training, the neural network may be used to determine patterns of the particular person and may adjust its operation based thereon.

Figure 2:
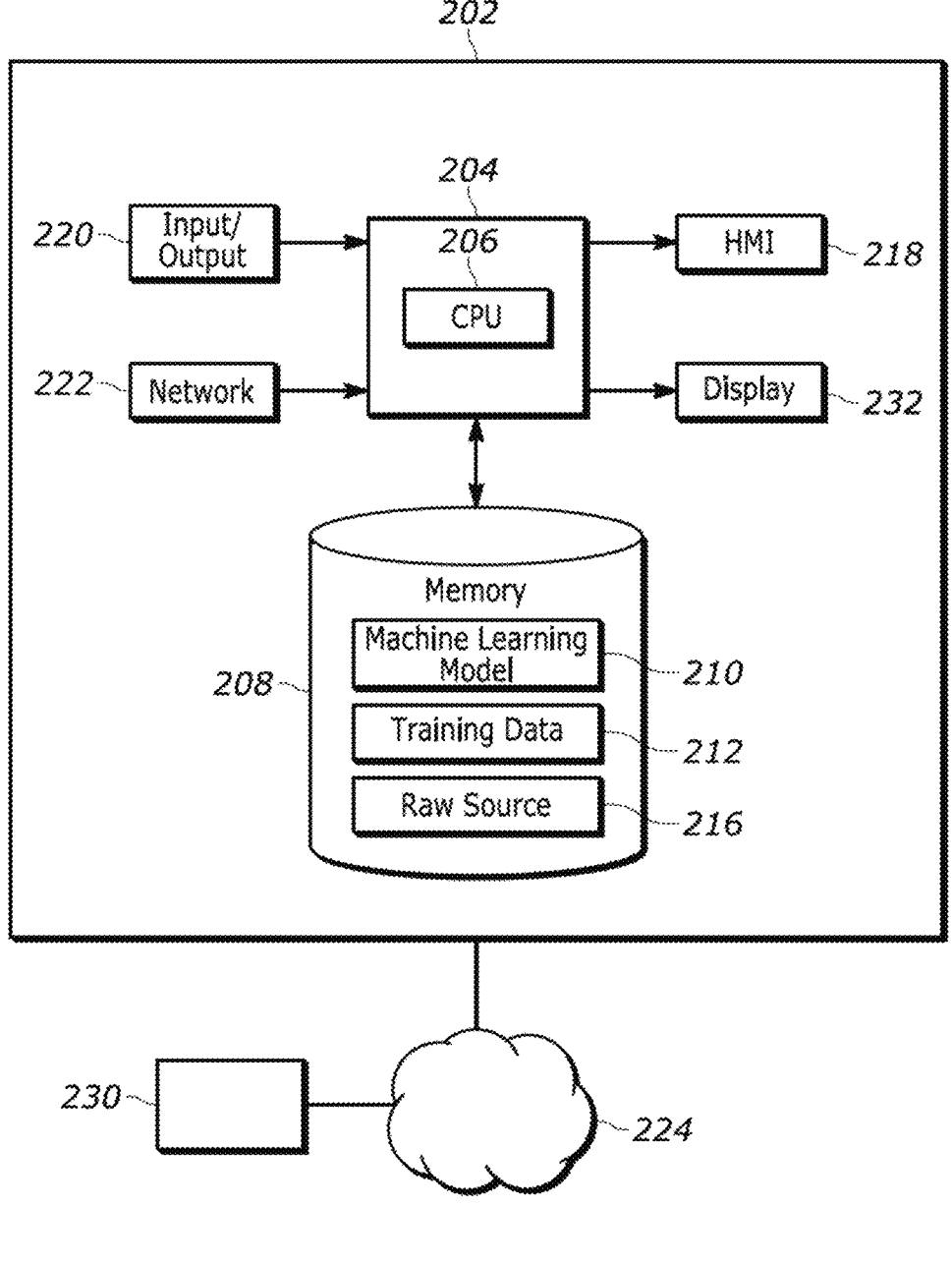
FIG. 2 shows a computer-implemented method 200 for training a neural network.

FIG. 2 depicts a system 200 to implement the machine learning models described herein, for example the deep neural networks used to perform personal identification using data obtained from received wireless signals as described above and in further detail below. Other types of machine learning models can be used, and the DNNs described herein are not the only types of machine learning models capable of being used in the system of this disclosure. For example, if the input image contains an ordered sequence of pixels after converting CSI values to pixels in an image), a CNN may be utilized. The system 200 can be implemented to perform one or more of the phases of image recognition described herein. The system 200 may include at least one computing system 202. The computing system 202 may include at least one processor 204 that is operatively connected to a memory unit 208. The processor 204 may include one or more integrated circuits that implement the functionality of a central processing unit (CPU) 206. The CPU 206 may be a commercially available processing unit that implements an instruction set such as one of the x86, ARM, Power, or MIPS instruction set families. During operation, the CPU 206 may execute stored program instructions that are retrieved from the memory unit 208. The stored program instructions may include software that controls operation of the CPU 206 to perform the operation described herein. In some examples, the processor 204 may be a system on a chip (SoC) that integrates functionality of the CPU 206, the memory unit 208, a network interface, and input/output interfaces into a single integrated device. The computing system 202 may implement an operating system for managing various aspects of the operation. While one processor 204, one CPU 206, and one memory 208 is shown in FIG. 2, of course more than one of each can be utilized in an overall system.

The memory unit 208 may include volatile memory and non-volatile memory for storing instructions and data. The non-volatile memory may include solid-state memories, such as NAND flash memory, magnetic and optical storage media, or any other suitable data storage device that retains data when the computing system 202 is deactivated or loses electrical power. The volatile memory may include static and dynamic random-access memory (RAM) that stores program instructions and data. For example, the memory unit 208 may store a machine learning model 210 or algorithm, a training dataset 212 for the machine learning model 210, raw source dataset 216.

The computing system 202 may include a network interface device 222 that is configured to provide communication with external systems and devices. For example, the network interface device 222 may include a wired and/or wireless Ethernet interface as defined by Institute of Electrical and Electronics Engineers (IEEE) 802.11 family of standards. The network interface device 222 may include a cellular communication interface for communicating with a cellular network (e.g., 3G, 4G, 5G). The network interface device 222 may be further configured to provide a communication interface to an external network 224 or cloud.

The external network 224 may be referred to as the world-wide web or the Internet. The external network 224 may establish a standard communication protocol between computing devices. The external network 224 may allow information and data to be easily exchanged between computing devices and networks. One or more servers 230 may be in communication with the external network 224.

The computing system 202 may include an input/output (I/O) interface 220 that may be configured to provide digital and/or analog inputs and outputs. The I/O interface 220 is used to transfer information between internal storage and external input and/or output devices (e.g., HMI devices). The I/O 220 interface can includes associated circuitry or BUS networks to transfer information to or between the processor(s) and storage. For example, the I/O interface 220 can include digital I/O logic lines which can be read or set by the processor(s), handshake lines to supervise data transfer via the I/O lines; timing and counting facilities, and other structure known to provide such functions. Examples of input devices include a keyboard, mouse, sensors, etc. Examples of output devices include monitors, printers, speakers, etc. The I/O interface 220 may include additional serial interfaces for communicating with external devices (e.g., Universal Serial Bus (USB) interface). The I/O interface 220 can be referred to as an input interface (in that it transfers data from an external input, such as a sensor), or an output interface (in that it transfers data to an external output, such as a display).

The computing system 202 may include a human-machine interface (HMI) device 218 that may include any device that enables the system 200 to receive control input. Examples of input devices may include human interface inputs such as keyboards, mice, touchscreens, voice input devices, and other similar devices. The computing system 202 may include a display device 232. The computing system 202 may include hardware and software for outputting graphics and text information to the display device 232. The display device 232 may include an electronic display screen, projector, printer or other suitable device for displaying information to a user or operator. The computing system 202 may be further configured to allow interaction with remote HMI and remote display devices via the network interface device 222.

The system 200 may be implemented using one or multiple computing systems. While the example depicts a single computing system 202 that implements all of the described features, it is intended that various features and functions may be separated and implemented by multiple computing units in communication with one another. The particular system architecture selected may depend on a variety of factors.

The system 200 may implement a machine learning algorithm 210 that is configured to analyze the raw source dataset 216. The raw source dataset 216 may include raw or unprocessed sensor data that may be representative of an input dataset for a machine learning system. The raw source dataset 216 may include video, video segments, images, text-based information, audio or human speech, time series data (e.g., a pressure sensor signal over time), raw or partially processed sensor data (e.g., radar map of objects), wireless signals in terms of CSI, RSSI, CIR. Moreover, the raw source dataset 216 may be input data derived from an associated sensor such as a camera, lidar, radar, ultrasonic sensor, motion sensor, thermal imaging camera, wireless receivers, or any other type of sensor that produces associated data with spatial dimensions where there is some notion of a "foreground" and a "background" within those spatial dimensions. References to an input or input "image" herein is not necessarily from a camera, but can be from any of the above-listed sensors. Several different examples of inputs are shown and described with reference to FIGS. 6-12. In some examples, the machine learning algorithm 210 may be a neural network algorithm (e.g., deep neural network) that is designed to perform a predetermined function. For example, the neural network algorithm may be configured to identify defects (e.g., cracks, stresses, bumps, etc.) in a part subsequent to the manufacture of that part but prior to leaving the plant.

The computer system 200 may store a training dataset 212 for the machine learning algorithm 210. The training dataset 212 may represent a set of previously constructed data for training the machine learning algorithm 210. The training dataset 212 may be used by the machine learning algorithm 210 to learn weighting factors associated with a neural network algorithm. The training dataset 212 may include a set of source data that has corresponding outcomes or results that the machine learning algorithm 210 tries to duplicate via the learning process.

The machine learning algorithm 210 may be operated in a learning mode using the training dataset 212 as input. The machine learning algorithm 210 may be executed over a number of iterations using the data from the training dataset 212. With each iteration, the machine learning algorithm 210 may update internal weighting factors based on the achieved results. For example, the machine learning algorithm 210 can compare output results (e.g., a reconstructed or supplemented image, in the case where image data is the input) with those included in the training dataset 212. Since the training dataset 212 includes the expected results, the machine learning algorithm 210 can determine when performance is acceptable. After the machine learning algorithm 210 achieves a predetermined performance level (e.g., 100% agreement with the outcomes associated with the training dataset 212), or convergence, the machine learning algorithm 210 may be executed using data that is not in the training dataset 212. It should be understood that in this disclosure, "convergence" can mean a set (e.g., predetermined) number of iterations have occurred, or that the residual is sufficiently small (e.g., the change in the approximate probability over iterations is changing by less than a threshold), or other convergence conditions. The trained machine learning algorithm 210 may be applied to new datasets to generate annotated data.

The machine learning algorithm 210 may be configured to identify a particular feature in the raw source data 216. The raw source data 216 may include a plurality of instances or input dataset for which supplementation results are desired. For example, the machine learning algorithm 210 may be configured to identify the presence of a pedestrian in video images and annotate the occurrences. In another example, the machine learning algorithm 210 may be configured to identify the presence of a defect in a manufactured part by capturing images of that part. The machine learning algorithm 210 may be programmed to process the raw source data 216 to identify the presence of the particular features. The machine learning algorithm 210 may be configured to identify a feature in the raw source data 216 as a predetermined feature (e.g., obstacle, pedestrian, road sign, etc.). The raw source data 216 may be derived from a variety of sources. For example, the raw source data 216 may be actual input data collected by a machine learning system. The raw source data 216 may be machine generated for testing the system. As an example, the raw source data 216 may include raw video images from a camera.

Figure 3A:
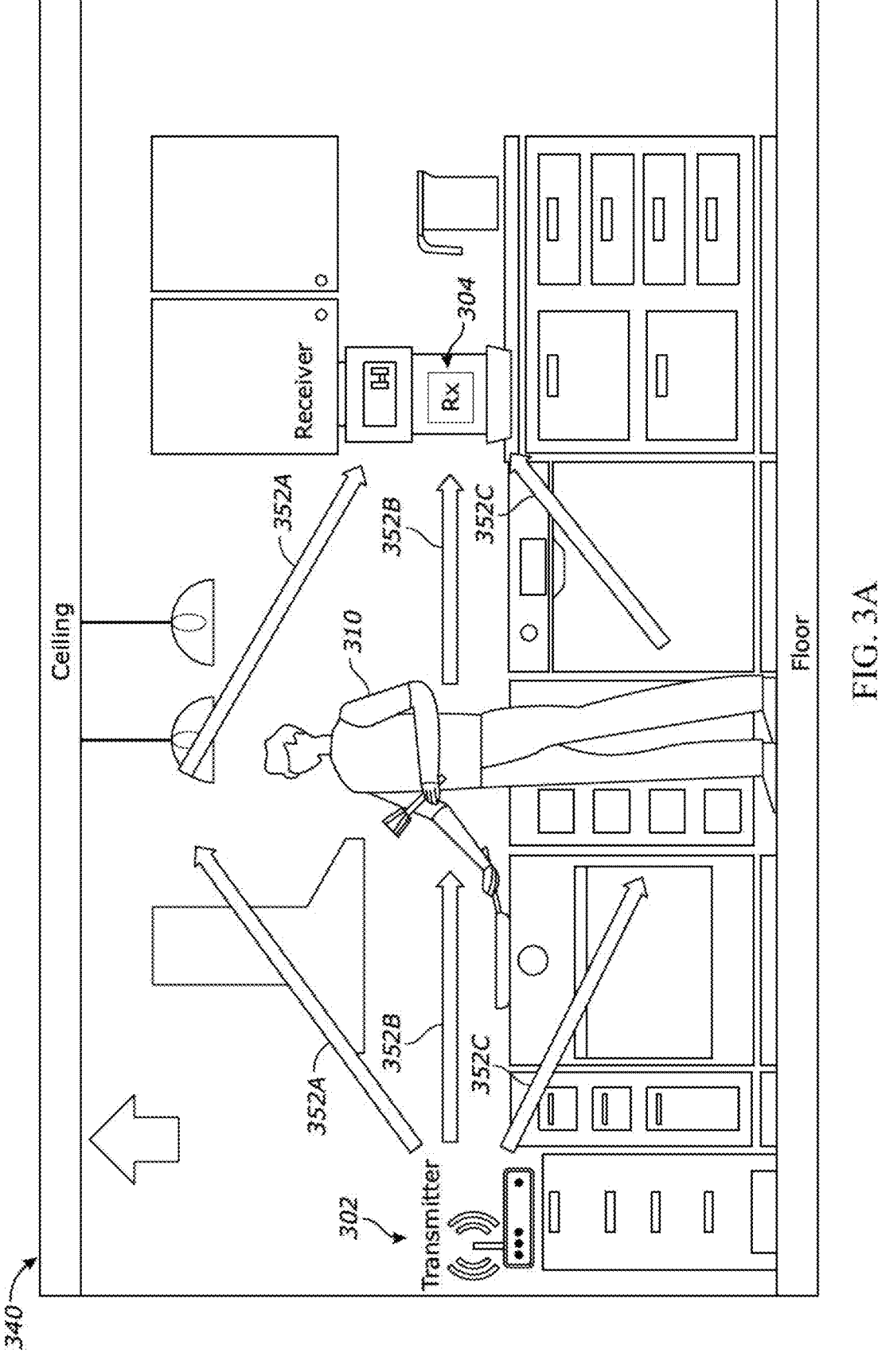
FIG. 3A shows an example of one embodiment of a system utilizing information from wireless signals for PID.

FIG. 3A shows an example of one embodiment of a system utilizing information from wireless signals for PID. In the example shown, wireless signals 325A, 325B, and 325C are transmitted from transmitter 302 to receiver 304. Wireless transmitter 302 may, in various embodiments, be a Wi-Fi router in a home, although the scope of the disclosure is not limited to Wi-Fi implementations and thus contemplates others (e.g., Bluetooth). Similarly, while FIG. 3A depicts a home environment, the disclosure is not limited in this manner, and thus the various systems and methods disclosed herein may be implemented in a wide variety of environments.

Receiver 304 in the embodiment shown is embedded in a home appliance (e.g., a coffee maker) that may be operated as an Internet of Things (IoT) device. More generally, the receiver may be a part of virtually any type of appliance or equipment capable of receiving and processing wireless signals transmitted from transmitter 302. Both transmitter 302 and receiver 304 are located in a space (e.g., a room in a home) that may include other static surfaces 340 that are part of cabinets, walls, floor and ceiling, furniture, and so on. In this example, a person 310 is located in a path between transmitter 302 and receiver 304, and may attenuate or block wireless signals in that particular path.

The wireless signals 325A, 325B, and 325C transmitted by transmitter are subject to multipath propagation as shown in FIG. 3A. The signals may be reflected off of various static surfaces 340 before being detected at receiver 304. Due to the different paths and thus length of travel, portions of wireless signals transmitted at a given instant may be received at different times by receiver 304. Accordingly, receiver 304 may utilize beamforming techniques to combine received signals as received at different angles (via different paths) to enhance received signal strength.

Receiver 304 in the embodiment shown may utilize the multipath propagation and knowledge of the environment to detect the presence of person 310 and motion thereof. As person 310 may attenuate or block some wireless signals, the presence of and motion by person 310 may be detected at receiver 304. In detecting the presence of person 310 (and more generally) any person, receiver 304 may, utilizing various artificial intelligence/machine learning (AI/ML) techniques, perform both coarse-grained and fine-grained identification. For example, the coarse-grained identification may determine whether the detected person is an adult or a child, and may further determine their approximate size. For the fine-grained identification, receiver 304 may determine the presence of and identify a particular person 310 based on factors such as gait, other motion signatures, and so on.

Using the AI/ML techniques of the present disclosure, a model may be subject to multi-classifier training in order to identify various persons that may carry out various actions in the space that includes both transmitter 302 and receiver 304. Using the AI/ML techniques, the receiver 304 may also detect usage patterns for the various persons and may perform additional actions based thereon. For example, if receiver 304 is embedded in a coffee machine, it may cause the coffee machine to dispense coffee in a certain manner (e.g., black, cream but no sugar, etc.) during the morning in response to detection of person 310 in response to having learned corresponding usage patterns. Alternatively, an appliance such as a coffee machine in which receiver 310 is embedded may utilize audio to ask the person if they would like a certain action to be taken upon detecting their presence and performing the corresponding identification.

Figure 3B:
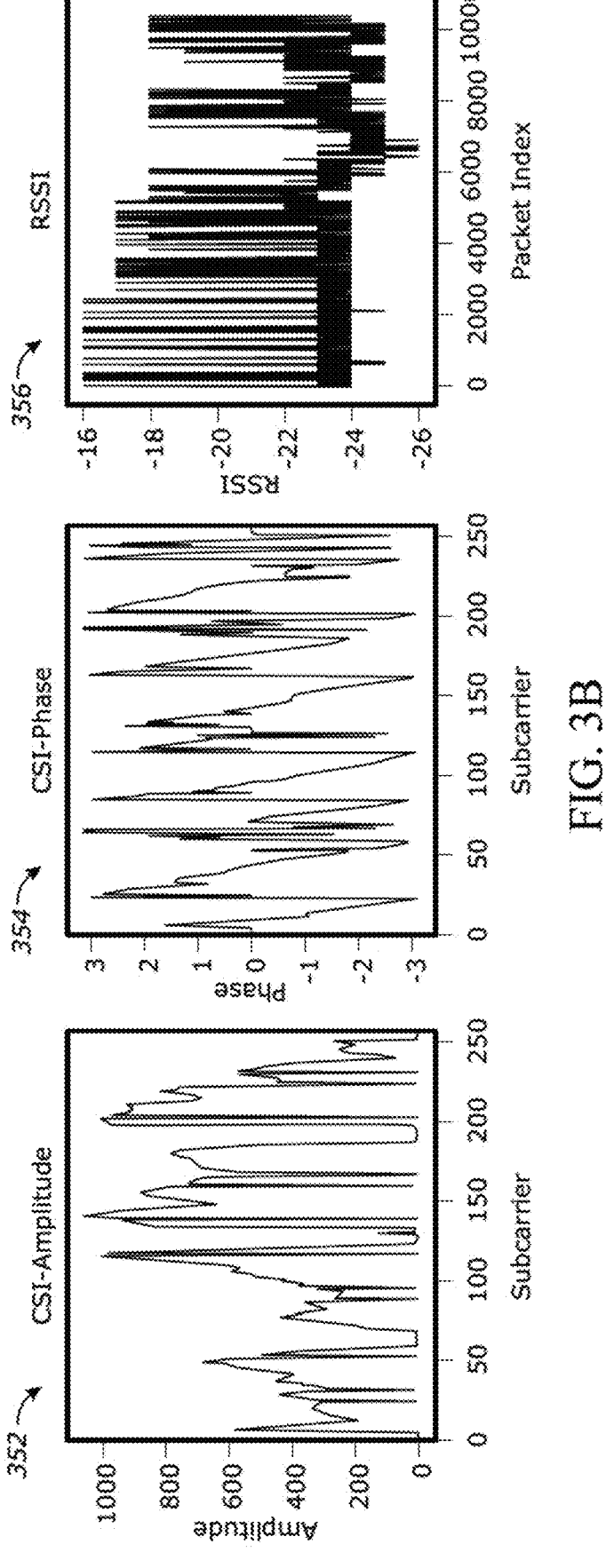
FIG. 3B shows an example of information that may be extracted from wireless signals for use in one embodiment of a method for determining PID.

FIG. 3B shows an example of information that may be extracted from wireless signals for use in one embodiment of a method for determining PID. In particular, FIG. 3B illustrates, for a single packet received at a receiver (e.g., receiver 304 of FIG. 3A), CSI amplitude information 352, CSI phase information 354, and CSI received signal strength indicator (RSSI) information 356.

As noted above with reference to FIG. 3A, wireless signals are subject to multipath propagation between a transmitter and a receiver. When disturbances are introduced into the various propagation paths, the amplitude, phase, and received signal strength of these signals can be affected at the receiver. Accordingly, when a person in motion passes through the various propagation paths, the receiver may detect this motion via changes in the amplitude, phase, and received signal strength at the receiver. Furthermore, the changes in amplitude, phase, and received signal strength, within a given packet or over a number of packets may be used to determine characteristics of the motion by the person. For example, human gait is unique to every individual due to various factors. Accordingly, the changes in amplitude, phase, and received signal strength, within a given packet or over a number of packets may be used to determine a gait of a particular person during training of a machine learning model, and later, for classification and thus identification of the particular person. This information, combined with other information (e.g., usage patterns and routines of the particular person) may be used to carry out additional actions by equipment associated with the receiver.

Figure 3C:
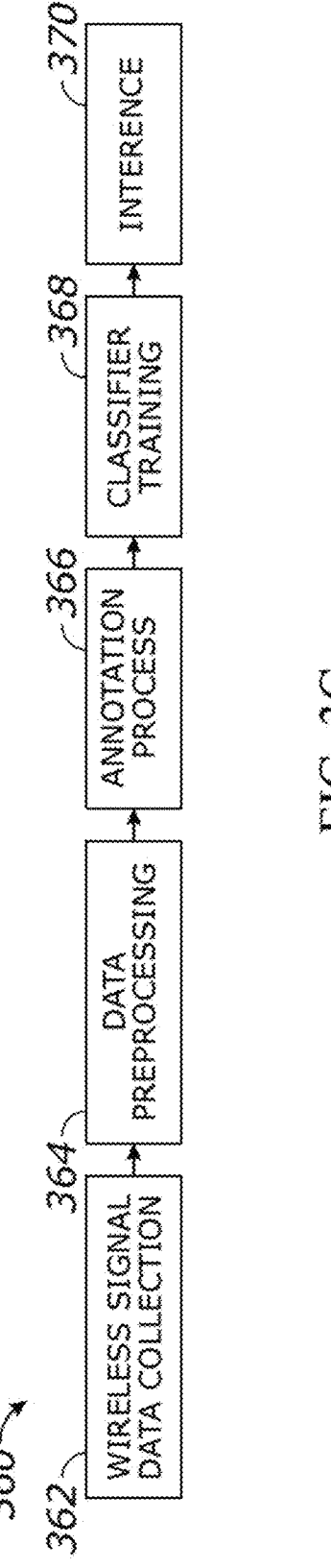
FIG. 3C shows a workflow diagram for one embodiment of a method per the disclosure.

FIG. 3C shows a workflow diagram for one embodiment of a method per the disclosure. Method 360 in the embodiment shown may be carried out in a wide variety of implementations that are included in or associated with a wireless receiver. Method 360 includes wireless signal data collection (block 362), data preprocessing (block 364), an annotation process (block 366), classifier training (block 368) and inference (block 370). These various operations will now be explained in further detail.

For wireless signal data collection (block 362), a receiver may be used to sense wireless signals and collect information therefrom. For example, a Wi-Fi receiver may receive wireless signals in packets, and may collect CSI (e.g., amplitude and phase) from the received packets. Variations of the amplitude and phase detected in the CSI, within individual packets as well as over a number of packets, may be used to detect human motion within a space (e.g., a room in a home) in which both the transmitter and receiver are located.

The transmitter may be, in various embodiments, a Wi-Fi router that is pre-existing within the space, although other types of transmitters (e.g., Bluetooth) are possible and contemplated within the scope of this disclosure. The receiver, as noted above, may be embedded in an appliance or other equipment which may use the information obtained from the CSI of the received packets for identification purposes. In various embodiments, the receiver may be connected to a laptop/tablet/phone to control the CSI collection and visually inspect this data during this sensing stage.

CSI traces within the packets may be used to explicitly capture time domain (e.g., variations in amplitude over time) as well as frequency domain information. These traces may be particularly sensitive to human motion within the environment. Accordingly, amplitude, phase and received signal strength indicator (RSSI) values from each CSI trace may be determined to gain different perspectives of the channel frequency response originating from human motion.

Data preprocessing (block 364) may perform various processing tasks to minimize the effects of noise in the received packets. As noted above, CSI may be particularly sensitive to human motion, and may more generally be sensitive to the environment as a whole since the wireless signals travel to the receiver via multiple paths and thus, multiple reflections. For example, signals in a space may be reflected off of furniture, walls, ceilings, floors, cabinets, and other inanimate objects. Furthermore, the presence of other signal sources in the area (e.g., another Wi-Fi access point operating on the same channel) may create additional interference in the collected data. These factors may make the CSI signals extremely noisy. To reduce the influence of unwanted noise and enhance the detection of human motion, Method 360 may we apply a series of preprocessing steps to sanitize the signal data. For example, raw CSI data contains null and pilot subcarriers which are part of the Orthogonal Frequency Division Multiplexing (OFDM) stack, to ensure less interference for users operating on multiple frequency channels. These subcarriers are removed to reduce dimensionality and redundancy as they also do not carry any useful information. CSI segments having high human motion content may then be selected by utilizing the annotated labels during data collection.

One embodiment, which will be discussed below in reference to FIG. 4A, performs preprocessing by utilizing CSI amplitude as the identification features. Another embodiment may utilize preprocessing that leverages CSI after phase unwrapping and phase sanitation, and will be discussed further below in reference to FIG. 4B. Embodiments utilizing Doppler frequency shift (DFS) maps from raw, complex-valued CSI are also possible and contemplated. In DFS embodiments, amplitude and phase values may be sanitized according to aforementioned algorithms followed by performance of a short time Fourier transform on smaller overlapping CSI windows. The result of this workflow may yield DFS maps showing high human motion sensitivity. An embodiment utilizing statistical features as input to a machine learning algorithm. In the statistical feature embodiment, the preprocessed CSI amplitude or phase may be used to extract specific time and frequency domain information such as mean, variance, fast Fourier transformations (FFT), and so on. It is noted that preprocessing using any combination of the features of these embodiments is also possible and contemplated.

The annotation process (block 366) may be used for person identification. In various embodiments, CSI samples corresponding to an individual may be given an anonymous label for privacy protection, for e.g., "Person A". The labels may remain same for every individual regardless of the change in environment, time of collection, so as to remain consistent for PID task. Depending on the number of people in the data collection and annotation stages, the type of classifier training may change to either binary or multi-class classification. In this phase, each time segment (e.g., 2 seconds of data) may be annotated with a class, e.g., Person A. In one embodiment configured for use in a home, the total number of classes may be equal to the total number of occupants in a home, or it could be one more (e.g., an unknown visitor). These annotations can be collected from a user as an initial set up stage, or collected in the background based on t user interaction with a product, e.g., a coffee machine. For example, the coffee machine can just monitor the behavior of the occupants for seven days and when someone dispenses a coffee, it will take the previous sequences of Wi-Fi data and label it with a user profile, e.g., Person A, and use this data for future reference.

Classifier training may be carried out in various embodiments, the features of which may be combinable with one another. One embodiment may utilize a 2D convolution neural network (CNN) based on standard ResNet18 residual connections and squeeze-excitation (SE) blocks. Such a network may have a low number of parameters, and may take. The network has very few parameters (680K) and takes spatial-temporal CSI amplitude as input, using the input to learn to predict the correct label corresponding to everyone in provided datasets. The proposed neural network may include, in one embodiment, an input convolution layer of kernel size 7×7. In another embodiment, instead of 7×7 filter, a different filter size may be used, e.g., a 51×51 filter. The large input convolutions at input space may lead an intake of more CSI information in the time and frequency domains, thereby leading to increased learning of feature representations in the downstream convolution blocks. Moving to the deeper layers of the network, the residual identity blocks may preserve more information in subsequent deeper layers while the SE blocks may improve the representational power of the network by enabling it to perform dynamic channel-wise feature recalibration. Embodiments may also use a ResNet18 model as a baseline to compare the performance of a network which may have a large number of parameters. The training stage may automatically conclude when the models achieve a high classification accuracy and consequently low training objective loss on the validation sets. In addition to amplitude, phase information may also be provided as input to the neural network. Multiple separate approaches for utilizing phase information may be implemented. For example, the amplitude and phase may be concatenated as a long sequence and learnt jointly through a single network (early fusion). In another example, two separate neural networks may be trained to learn amplitude and phase features separately and concatenate the feature maps before distilling the knowledge to classification layers (late fusion).

Another embodiment of the classifier training carried out according to block 368, statistical features may be used for the classification. In this embodiments, a comprehensive set of features from Wi-Fi CSI data may be extracted for use in machine learning models. Both time-domain and frequency-domain features may be extracted from the CSI data, which may be represented as a three-dimensional array with dimensions corresponding to samples, subcarriers, and time steps.

In various embodiments, the classifier training may include performing principal component analysis (PCA): PCA is applied to transform the data, reducing its dimensionality while retaining essential information. This step involves reshaping each sample to align time steps and channels and then applying PCA, resulting in a set of principal components that capture the most significant variations in the signal.

The classifier training may include, in some embodiments, determining a rate of change of RSSI, calculating the rate of change of the received signal strength indicator (RSSI) over a specified interval. This may provide insight into how the signal strength varies over time, which can be aid in understanding the dynamics of the wireless channel.

Embodiments of the classifier training may also utilize time domain features. Various statistical measures may be computed across subcarriers, including mean, median, variance, standard deviation, skewness, kurtosis, root mean square (RMS), and zero-crossing rate. These features may help characterize the distribution and variability of signals in the time domain.

Embodiments may also, or alternatively, use frequency domain features. A Fast Fourier Transform (FFT) may be applied to extract features like spectral centroid, spectral bandwidth, spectral flatness, and peak frequency. These features capture essential characteristics of the signal's frequency content, such as its dominant frequency and spread.

Time-frequency representations may be utilized in some embodiments. For example, Short-time Fourier Transform (STFT) coefficients may be computed and analyzed, providing a combined view of how the signal's frequency content evolves over time. Correlation Analysis may also be utilized in some embodiments. Correlation across subcarriers may be calculated for each time point, offering insights into the relationships and dependencies between different parts of the spectrum.

The various methodologies used in classifier training may consolidate the diverse features discussed above into a two-dimensional feature matrix suitable for machine learning models. This transformation may involve reshaping and bin averaging, which may in turn reduce the number of time steps for the classification task. Then, the feature matrix may be flattened and fed to classifiers like SVM, XGBoost, MLP, random forest, decision tree, and so on.

Embodiments of the classifier training in which similar statistical features, similar to those discussed above, may also be used with a sequence model being used for the classification task in order to capture the temporal pattern of the human motion. Different sequence models may be used in various embodiments.

In one embodiment, the sequence model may involve a Bidirectional Gated Recurrent Unit (BiGRU) with an attention mechanism. The BiGRU layer may process input sequences in both forward and backward directions, capturing dependencies across time steps. The attention mechanism may assign weights to different parts of the GRU output, focusing on more relevant sequence segments for the task at hand. The network may also include a dropout layer for regularization, which may in turn reduce the likelihood of overfitting. Finally, a fully connected layer may map the attention-weighted features to the desired output classes. This combination of bidirectional GRU and attention may be effective for tasks where understanding the context and importance of different parts of a sequence is a component. The statistical features may, in various embodiments, be fed in different timesteps as inputs to the BiGRU units. In some embodiments, preprocessed CSI amplitude and/or CSI phase information in different timesteps may be fed as inputs into the BiGRU units.

Embodiments are also possible and contemplated in which Bidirectional Long Short Term Memory (LSTM) with an attention mechanism are used in the classification process as an alternate to the GRU discussed above. Recurrent Neural Network (RNN) architectures may be used in various embodiments.

In another embodiment, transformers are used to model the sequence. Several variations of the transformer can be utilized including (a) transformers with static positional encoding, (b) transformers with learnable positional encoding, and (c) transformers with static positional encoding for the temporal domain, and learnable positional encoding for the feature domain and vice versa.

Following classifier training, the trained models may be deployed for inference evaluation (block 370) by keeping the parameters frozen. Inference may be performed in either real-time or in an offline manner. The offline inference may follow steps the same or similar to those discussed above for, e.g., CSI amplitude processing and/or CSI phase processing, with the raw CSI samples provided as input to the trained model. One method of performing online inference is discussed below in reference to FIG. 4D.

Although not shown in FIG. 3C, embodiments including an actuation phase are also possible and contemplated. In the actuation phase, a system that include the receiver and executes the ML model may personalize a user experience of an appliance or other piece of equipment. The actuation may include performing various actions by the system (e.g., dispensing coffee according to personal preferences) with minimal (if any) input from the user.

Figure 4A:
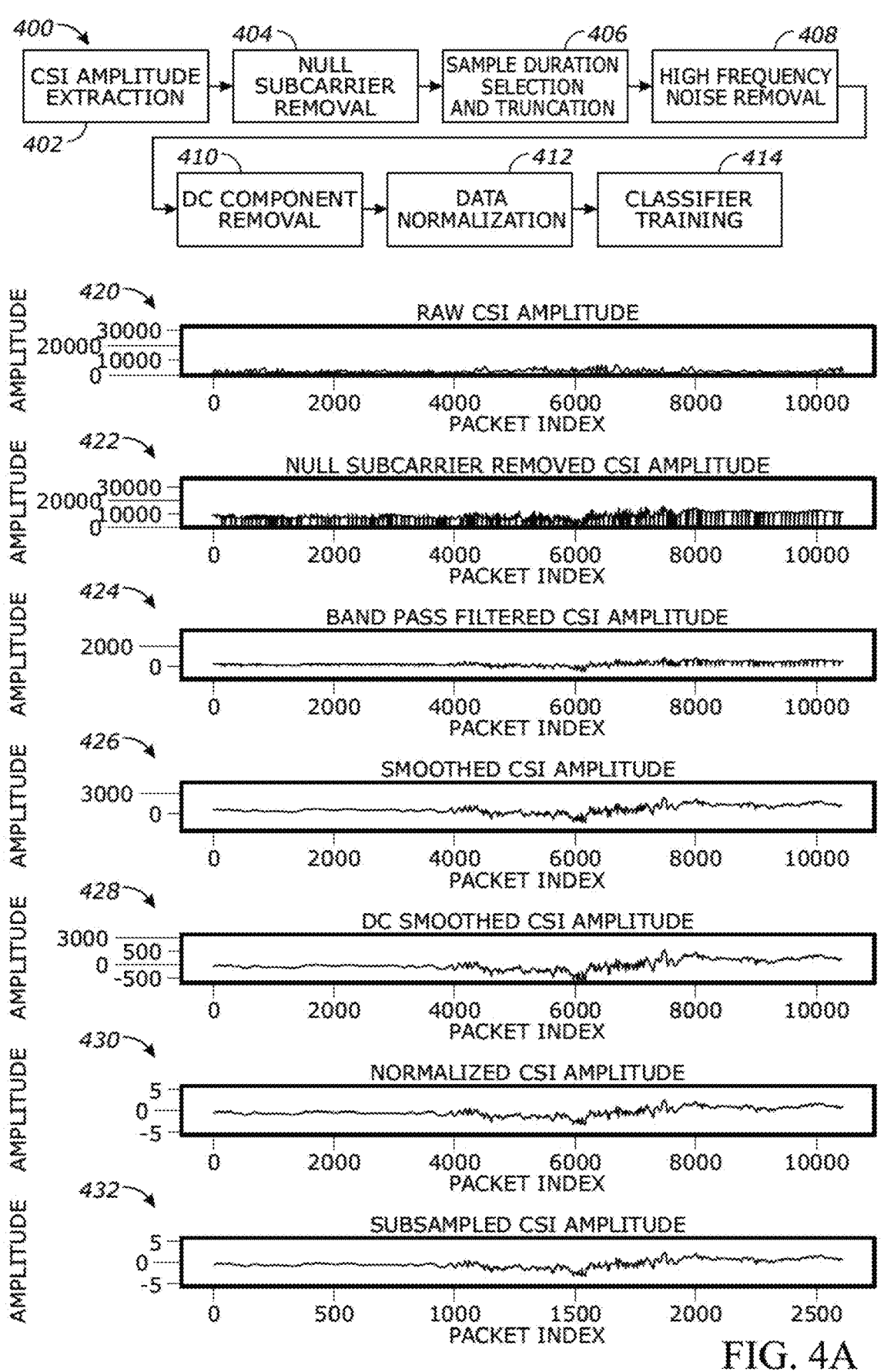
FIG. 4A shows a workflow diagram and signal characteristics for channel state information (CSI) amplitude pre-processing for one embodiment of the disclosed method.

FIG. 4A shows a workflow diagram and signal characteristics for CSI amplitude pre-processing for one embodiment of the disclosed method. As shown in FIG. 4A, null subcarriers may be removed from received packets, followed by noise removal using, e.g., a Butterworth bandpass filter and Hanning smoothing. Irrespective of the type of filter used, the filtering operation may remove high and very low frequency noise components that correspond to the reflections from inanimate objects (e.g., furniture, cabinets, etc.). Other types of stationary and non-stationary signal processing filters such as low pass, Wavelet-based methods may also be performed as different embodiment.

DC offset components may also be removed, followed by data normalization. To reduce the dimensionality further, lossless frequency-based subsampling may also be performed. In place of subsampling, PCA-based dimension reduction may also be used.

Method 400 includes CSI amplitude extraction (block 402, graphically illustrated in 420), which includes determining the raw amplitude of wireless signals received in a packet. The method then continues with null subcarrier removal (block 404, graphically illustrated in 404), as the null subcarriers do not carry information and are used primarily for shaping of the signal spectrum. Thereafter, the method performs sample duration selection and truncation (block 407), followed by filtering operations that include high frequency component removal (block 408) and DC component removal (block 410). The filtering operations may be visualized as bandpass filtering in 424, smoothed CSI amplitude 426, and DC smoothed CSI amplitude 428. Thereafter, the remaining data is normalized (block 412, graphically illustrated in 430). The data is finally subsampled to reduce dimensionality by performing a lossless, frequency-based subsampling in the time domain, as shown in 432, with this data being input into the model for classifier training (block 424).

Figure 4B:
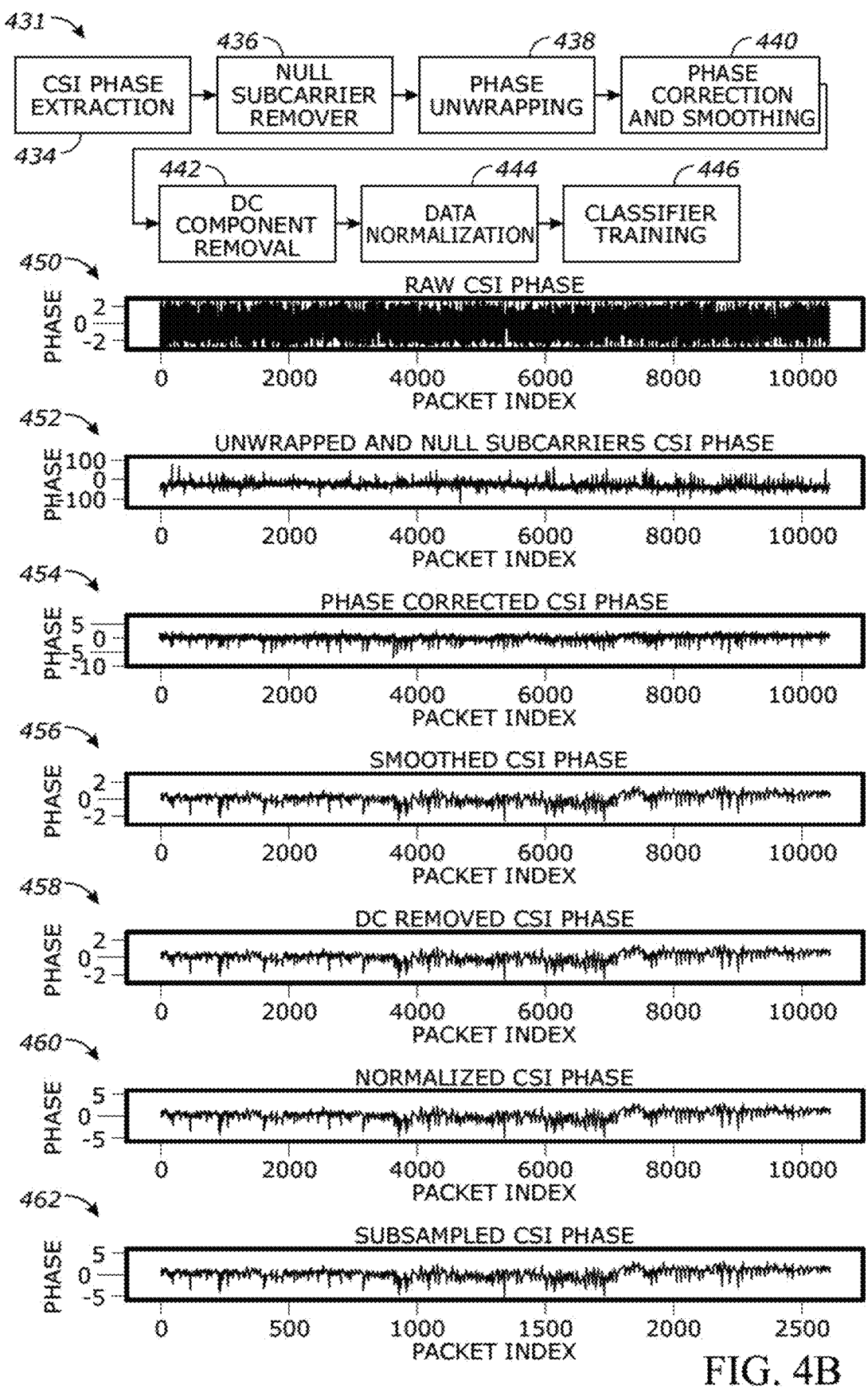
FIG. 4B shows a workflow diagram and signal characteristics for channel state information (CSI) phase pre-processing for one embodiment of the disclosed method.

FIG. 4B shows a workflow diagram and signal characteristics for channel state information (CSI) phase pre-processing for one embodiment of the disclosed method. In this example, phase of the wireless signals of a packet are leveraged as to extract the data for classifier training.

Method 431 includes CSI phase extraction (block 434) of raw CSI phase data, graphically illustrated in 450. The null subcarriers are removed and the phase data is unwrapped (blocks 436 and 438, respectively, graphically illustrated in 452), followed by phase correction and smoothing (block 440, graphically illustrated in 454). Thereafter, the CSI phase data is smoothed (graphically illustrated in 456) and DC components are subsequently removed (block 442, graphically illustrated in 458). Data normalization is then carried out (block 444, graphically illustrated in 460). Thereafter, subsampling is performed (462) and the subsampled data is input into the model for classifier training (block 446).

Figures 4C, 4D:
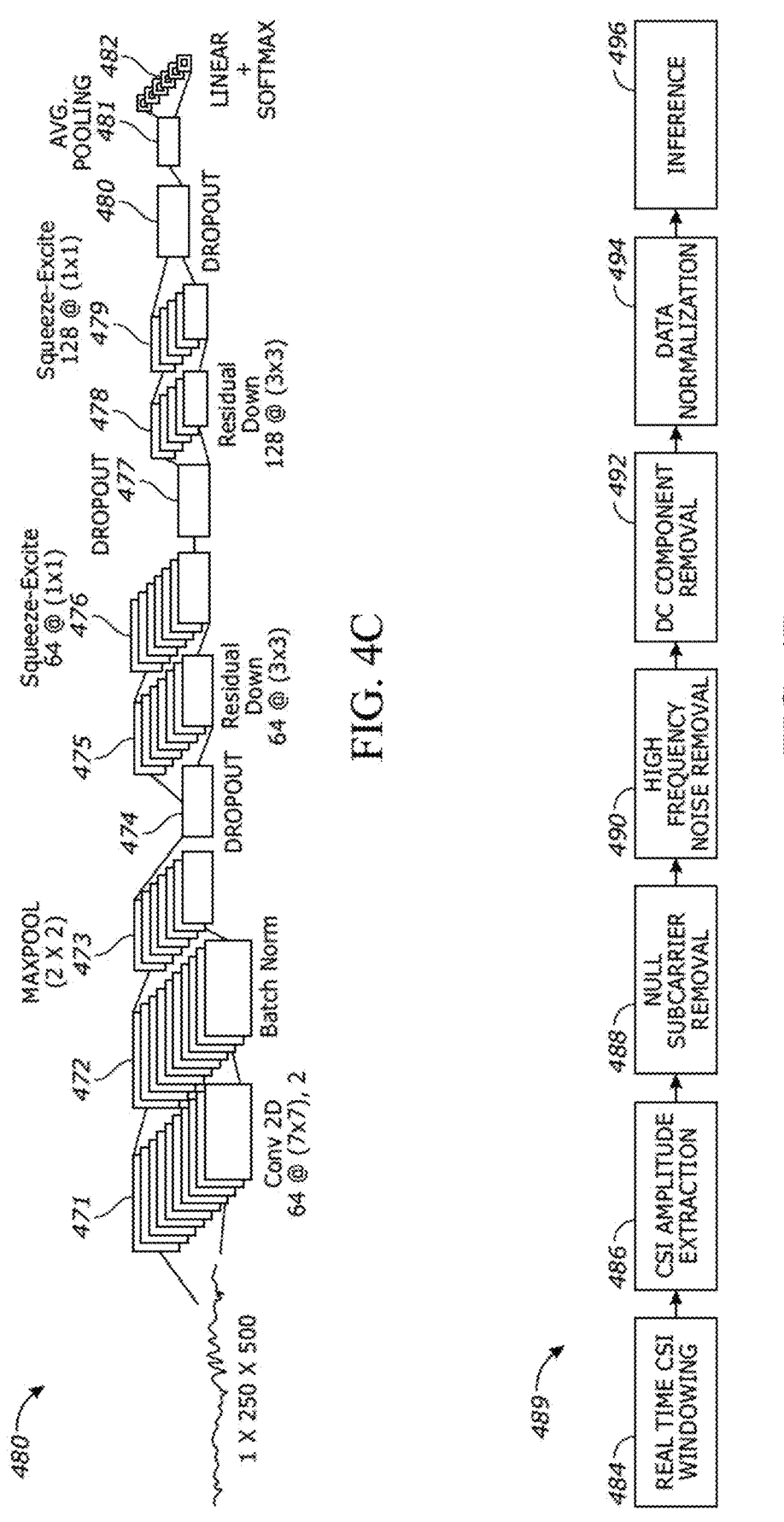
FIG. 4C shows a neural network used in one embodiment of the disclosure.
FIG. 4D is a workflow diagram illustrating one embodiment of a method for performing inference in accordance with the disclosure.

FIG. 4C shows a neural network and a workflow diagram illustrating operation of the same for one embodiment of the disclosed method. In the embodiment shown, neural network 480 includes an input convolution layer 471, which has a kernel size of 7×7 in this particular example, although embodiments using filters of different sizes are possible and contemplated. Generally speaking, the input convolutions may be large in various embodiments so as to enable more the input of more CSI data in the time and/or frequency domains, which can lead to better representations in subsequent convolution blocks of neural network 480.

The data that output from the input convolution layer 471 may be normalized by normalization layer 472. The nor-malized data output from normalization layer is then provided to maxpool layer 472, where it may be downsampled to reduce its spatial dimensions, which may in turn make the representation smaller and more manageable. The downsampled data may then be applied to dropout layer 474 to prevent overfitting in the downstream layers. The operations performed in dropout layer 474 may include randomly ignoring certain neurons and their respective connections. Neurons may be dropped at a specified rate, and this rate may be tunable in various embodiments.

The data from dropout block 474 may then be applied to ResNet layer 475, in which additional downsampling and convolution is performed. The data output from this layer, in this particular embodiment, includes 64 channels (and thus, 64 feature maps) with a 3×3 kernel for the convolution operation. Thereafter, the date from ResNet layer 475 is applied to squeeze-excite layer 476 to further refine the classification by performing channel-wise feature recalibration. The data output from layer 476 is then subject to another dropout operation in dropout layer 477.

After the dropout operation from layer 477, the resulting data is applied to another ResNet layer 478, in which additional downsampling and convolution using a convolution block comprising a 3×3 matrix is perform. This downsampled data is then provided to another squeeze-excite layers 479, followed by another dropout operation in dropout layer 480. Thereafter, the data from dropout layer 480 is applied to average pooling layer 471 to further reduce the spatial dimensions of the data. The reduced data is then provided to linear-softmax layer 481 for final classification. In the linear portion of layer 481, the output is provided as a combination of inputs in which a weight sum of inputs and a bias term are computed. The softmax function serves as an activation function for a multi-class classification operation, which in the context of this disclosure may include identifying one of a number of different persons. As the output of the softmax function may be interpreted as a probability of the input data belonging to a particular class, the output in the context of the disclosure may provide a probability that the input data corresponds to a particular person.

FIG. 4D is a workflow diagram illustrating one embodiment of a method for performing inference in accordance with the disclosure. More particularly, Method 489 as depicted in the illustrated embodiment may represent a real-time inference methodology using input data subsequent to training of a machine learning model, and thus the process for identifying a particular person. In this example, the CSI traces from real time packets may into the model as a continuous stream of data. Window-based slicing may be performed to get smaller chunks of the time series data and perform the consequent preprocessing steps that are similar training data preparation. After signal sanitization, the signal may be given as input to the classifier to output a class prediction for each moving window.

Method 489 includes real time CSI windowing (block 484) and CSI amplitude extraction (block 486). It is noted that while method 489 is discussed herein using CSI amplitude information, CSI phase information or other information may be used in other embodiments. Null subcarrier removal (block 488), high frequency noise removal (block 490), DC component removal (block 492), and data normalization (block 494) are also performed the same as or similarly as carried out during the training process. As a result, data is generated which may then be provided for inference (block 496) to perform the identification of a person per the discussion above.

Figure 5:
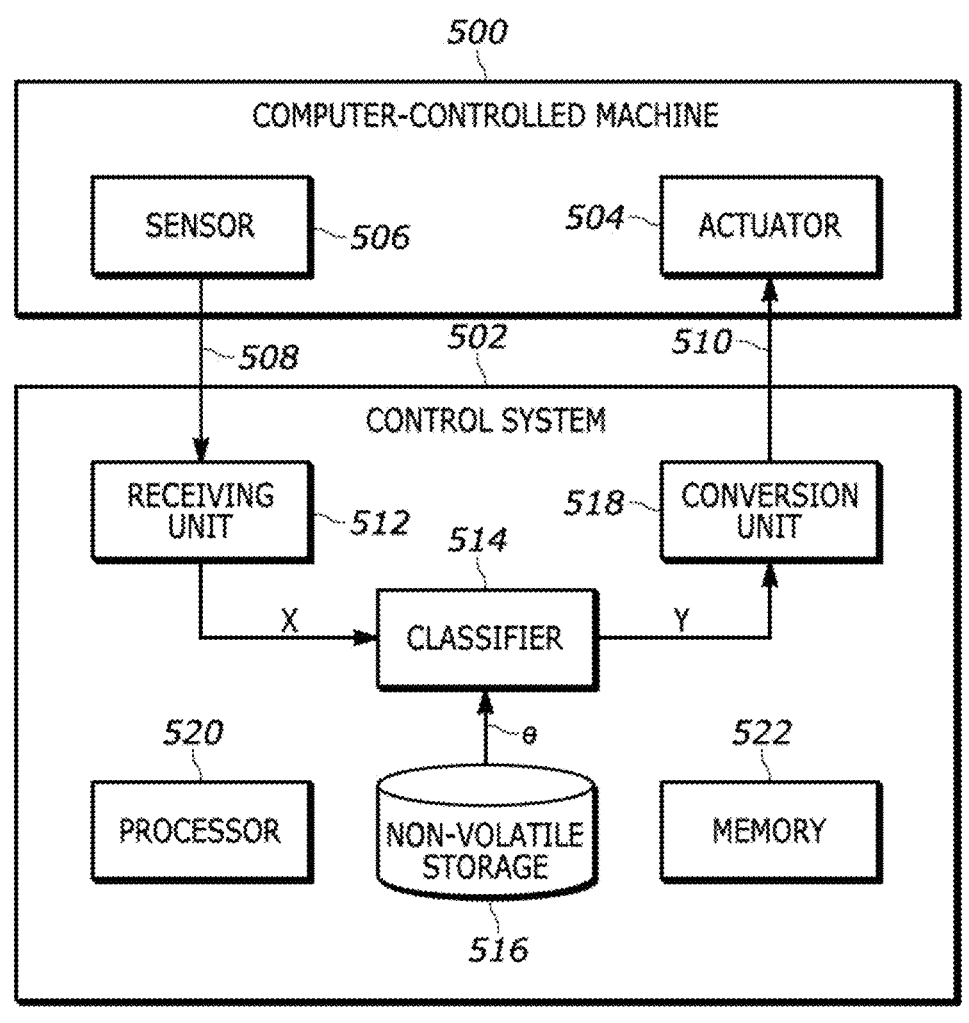
FIG. 5 depicts a schematic diagram of an interaction between computer-controlled machine 510 and control system 512.

FIG. 5 depicts a schematic diagram of an interaction between a computer-controlled machine 500 and a control system 502. Computer-controlled machine 500 includes actuator 504 and sensor 506. Actuator 504 may include one or more actuators and sensor 506 may include one or more sensors. Sensor 506 is configured to sense a condition of computer-controlled machine 500. Sensor 506 may be configured to encode the sensed condition into sensor signals 508 and to transmit sensor signals 508 to control system 502. Non-limiting examples of sensor 506 include wireless receivers, video, radar, LiDAR, ultrasonic and motion sensors, as described above with reference to FIGS. 1-2. In one embodiment, sensor 506 is a wireless sensor configured to sense an environment proximate to computer-controlled machine 500. Embodiments in which a combination of different sensors are also possible and contemplated.

Sensor 506 may also be, in various embodiments, a wireless signal receiver configured to receive wireless signals from a transmitter (e.g., Wi-Fi). Computer-controlled machine may utilize the received wireless signals for personal identification in various embodiments based on motion detection of a person in the vicinity and characteristics thereof used to train an ML model.

Control system 502 is configured to receive sensor signals 508 from computer-controlled machine 500. As set forth below, control system 502 may be further configured to compute actuator control commands 510 depending on the sensor signals and to transmit actuator control commands 510 to actuator 504 of computer-controlled machine 500.

As shown in FIG. 5, control system 502 includes receiving unit 512. Receiving unit 512 may be configured to receive sensor signals 508 from sensor 506 and to transform sensor signals 508 into input signals x. In an alternative embodiment, sensor signals 508 are received directly as input signals x without receiving unit 512. Each input signal x may be a portion of each sensor signal 508. Receiving unit 512 may be configured to process each sensor signal 508 to product each input signal x. Input signal x may include data corresponding to an image recorded by sensor 506.

Control system 502 includes a classifier 514. Classifier 514 may be configured to classify input signals x into one or more labels using a machine learning (ML) algorithm, such as a neural network described above. Classifier 514 is configured to be parametrized by parameters, such as those described above (e.g., parameter θ). Parameters θ may be stored in and provided by non-volatile storage 516. Classifier 514 is configured to determine output signals y from input signals x. Each output signal y includes information that assigns one or more labels to each input signal x. Classifier 514 may transmit output signals y to conversion unit 518. Conversion unit 518 is configured to covert output signals y into actuator control commands 510. Control system 502 is configured to transmit actuator control commands 510 to actuator 504, which is configured to actuate computer-controlled machine 500 in response to actuator control commands 510. In another embodiment, actuator 504 is configured to actuate computer-controlled machine 500 based directly on output signals y.

Upon receipt of actuator control commands 510 by actuator 504, actuator 504 is configured to execute an action corresponding to the related actuator control command 510. Actuator 504 may include a control logic configured to transform actuator control commands 510 into a second actuator control command, which is utilized to control actuator 504. In one or more embodiments, actuator control commands 510 may be utilized to control a display instead of or in addition to an actuator.

In another embodiment, control system 502 includes sensor 506 instead of or in addition to computer-controlled machine 500 including sensor 506. Control system 502 may also include actuator 504 instead of or in addition to computer-controlled machine 500 including actuator 504.

As shown in FIG. 5, control system 502 also includes processor 520 and memory 522. Processor 520 may include one or more processors. Memory 522 may include one or more memory devices. The classifier 514 (e.g., machine learning algorithms, such as those described above with regard to pre-trained classifier 306) of one or more embodiments may be implemented by control system 502, which includes non-volatile storage 516, processor 520 and memory 522.

Non-volatile storage 516 may include one or more persistent data storage devices such as a hard drive, optical drive, tape drive, non-volatile solid-state device, cloud storage or any other device capable of persistently storing information. Processor 520 may include one or more devices selected from high-performance computing (HPC) systems including high-performance cores, microprocessors, microcontrollers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 522. Memory 522 may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information.

Processor 520 may be configured to read into memory 522 and execute computer-executable instructions residing in non-volatile storage 516 and embodying one or more ML algorithms and/or methodologies of one or more embodiments. Non-volatile storage 516 may include one or more operating systems and applications. Non-volatile storage 516 may store compiled and/or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

Upon execution by processor 520, the computer-executable instructions of non-volatile storage 516 may cause control system 502 to implement one or more of the ML algorithms and/or methodologies as disclosed herein. Non-volatile storage 516 may also include ML data (including data parameters) supporting the functions, features, and processes of the one or more embodiments described herein.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

The processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

Figure 6:
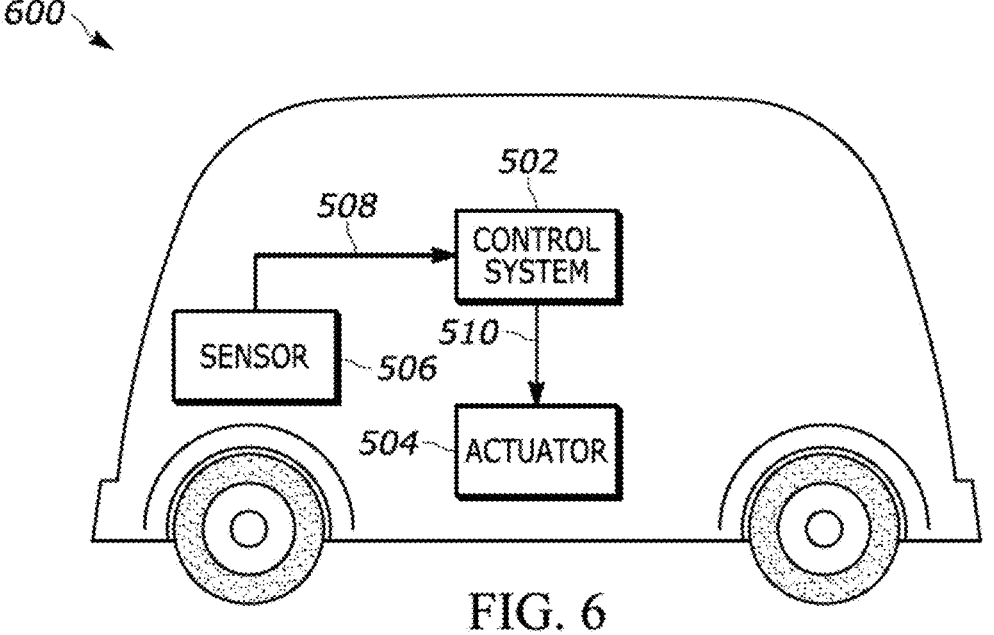
FIG. 6 depicts a schematic diagram of the control system of FIG. 1 configured to control a vehicle, which may be a partially autonomous vehicle or a partially autonomous robot.

FIG. 6 depicts a schematic diagram of control system 502 configured to control vehicle 600, which may be an at least partially autonomous vehicle or an at least partially autonomous robot. Vehicle 600 includes actuator 504 and sensor 506. Sensor 506 may include one or more video sensors, cameras, radar sensors, ultrasonic sensors, wireless transmitters and/or receivers, LiDAR sensors, and/or position sensors (e.g., GPS). One or more of the one or more specific sensors may be integrated into vehicle 600. Alternatively or in addition to one or more specific sensors identified above, sensor 506 may include a software module configured to, upon execution, determine a state of actuator 504.

Classifier 514 of control system 502 of vehicle 600 may be configured to detect objects in the vicinity of vehicle 600 dependent on input signals x. In such an embodiment, output signal y may include information characterizing the vicinity of objects to vehicle 600. Actuator control command 510 may be determined in accordance with this information. The actuator control command 510 may be used to avoid collisions with the detected objects. In some embodiments, classifier 514 may utilize wireless signals (e.g., Bluetooth signals) in the vehicle for PID purposes in accordance with the discussion above. For example, classifier 514 may utilize the wireless signals to identify a particular driver of the car, thereby enabling control system 502 to adjust a seat position for the particular driver upon entry into the vehicle.

In embodiments where vehicle 600 is an at least partially autonomous vehicle, actuator 504 may be embodied in a brake, a propulsion system, an engine, a drivetrain, or a steering of vehicle 600. Actuator control commands 510 may be determined such that actuator 504 is controlled such that vehicle 600 avoids collisions with detected objects. Detected objects may also be classified according to what classifier 514 deems them most likely to be, such as pedestrians or trees. The actuator control commands 510 may be determined depending on the classification. In a scenario where an adversarial attack may occur, the system described above may be further trained to better detect objects or identify a change in lighting conditions or an angle for a sensor or camera on vehicle 600.

In other embodiments where vehicle 600 is an at least partially autonomous robot, vehicle 600 may be a mobile robot that is configured to carry out one or more functions, such as flying, swimming, diving and stepping. The mobile robot may be an at least partially autonomous lawn mower or an at least partially autonomous cleaning robot. In such embodiments, the actuator control command 510 may be determined such that a propulsion unit, steering unit and/or brake unit of the mobile robot may be controlled such that the mobile robot may avoid collisions with identified objects.

In another embodiment, vehicle 600 is an at least partially autonomous robot in the form of a gardening robot. In such embodiment, vehicle 600 may use an optical sensor or a wireless receiver and/or a transmitter as sensor 506 to determine a state of plants in an environment proximate vehicle 600. Actuator 504 may be a nozzle configured to spray chemicals. Depending on an identified species and/or an identified state of the plants, actuator control command 510 may be determined to cause actuator 504 to spray the plants with a suitable quantity of suitable chemicals.

Vehicle 600 may be an at least partially autonomous robot in the form of a domestic appliance. Non-limiting examples of domestic appliances include a washing machine, a stove, an oven, a microwave, a coffee machine, or a dishwasher. In such a vehicle 600, sensor 506 may be an optical sensor or a wireless receiver and/or transmitter configured to detect a state of an object which is to undergo processing by the household appliance. For example, in the case of the domestic appliance being a washing machine, sensor 506 may detect a state of the laundry inside the washing machine. Actuator control command 510 may be determined based on the detected state of the laundry. In another example, if the domestic appliance is a coffee machine, personal identification may be carried out by the control system based on wireless signals received by the sensors 506 (a wireless receiver in this example), with the coffee machine being activated to dispense coffee according to personal preferences of the identified person.

Figure 7:
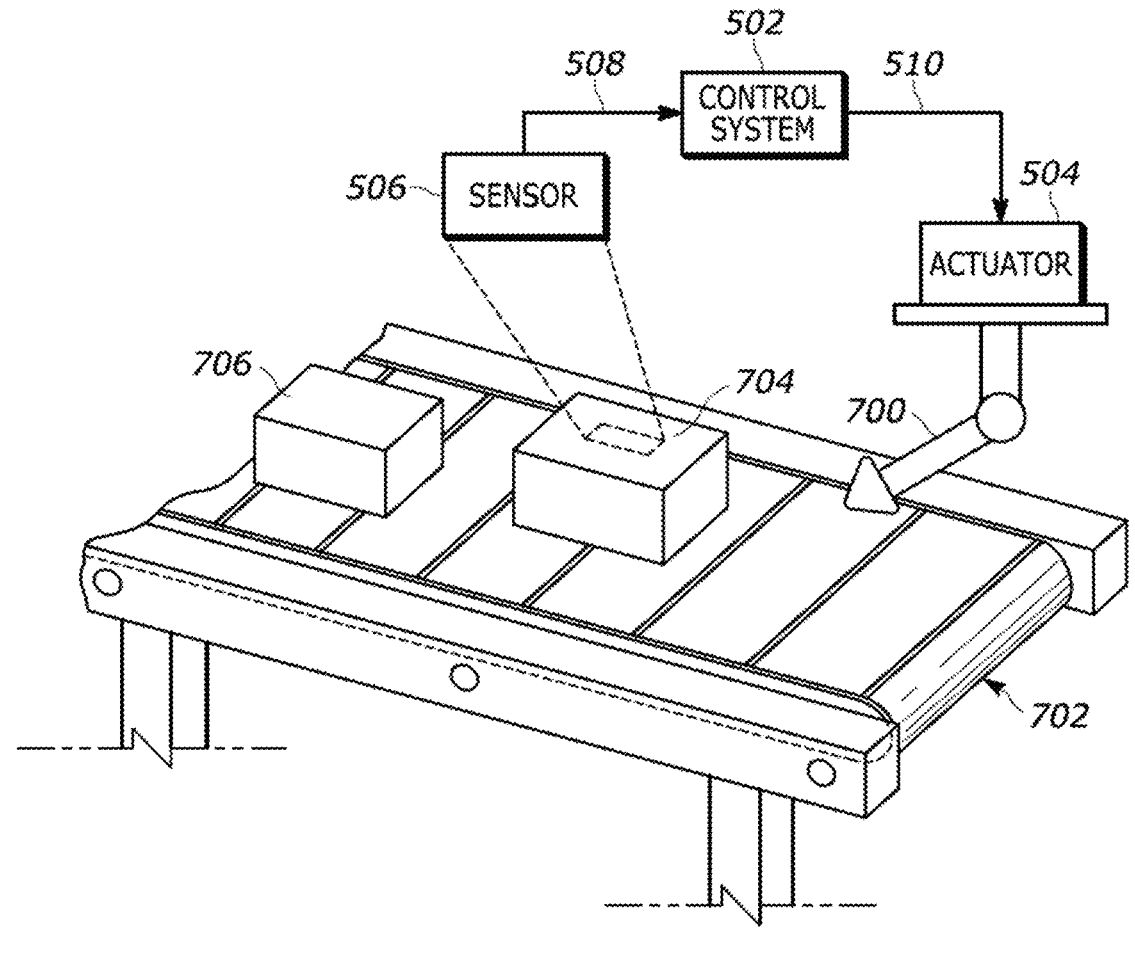
FIG. 7 depicts a schematic diagram of the control system of FIG. 1 configured to control a manufacturing machine, such as a punch cutter, a cutter or a gun drill, of manufacturing system, such as part of a production line.

FIG. 7 depicts a schematic diagram of control system 502 configured to control system 700 (e.g., manufacturing machine), such as a punch cutter, a cutter or a gun drill, of manufacturing system 702, such as part of a production line. Control system 502 may be configured to control actuator 504, which is configured to control system 700 (e.g., manufacturing machine).

Sensor 506 of system 700 (e.g., manufacturing machine) may be an optical sensor (such as those described above) configured to capture one or more properties of manufactured product 704. Classifier 514 may be configured to determine a state of manufactured product 704 from one or more of the captured properties. Actuator 504 may be configured to control system 700 (e.g., manufacturing machine) depending on the determined state of manufactured product 704 for a subsequent manufacturing step of manufactured product 704, or for binning the manufactured product 704 (e.g., discard, sorting, marking, trimming, or repair) if the manufactured product 704 has a detected defect. The actuator 504 may be configured to control functions of system 700 (e.g., manufacturing machine) on subsequent manufactured product 706 of system 700 (e.g., manufacturing machine) depending on the determined state of manufactured product 704.

In some embodiments, sensor 506 may be coupled to receive and process wireless signals (e.g., Wi-Fi signals) while control system 502 may use the information obtained therefrom for PID, in accordance with the discussion elsewhere herein. For example, using wireless signals detected by sensor 506, control system 502 may identify a particular person who works with system 700 on a regular basis. Based on the identification of the particular person, control system 502 may cause adjustments to system 700 (e.g., to the speed of a conveyor belt).

Figure 8:
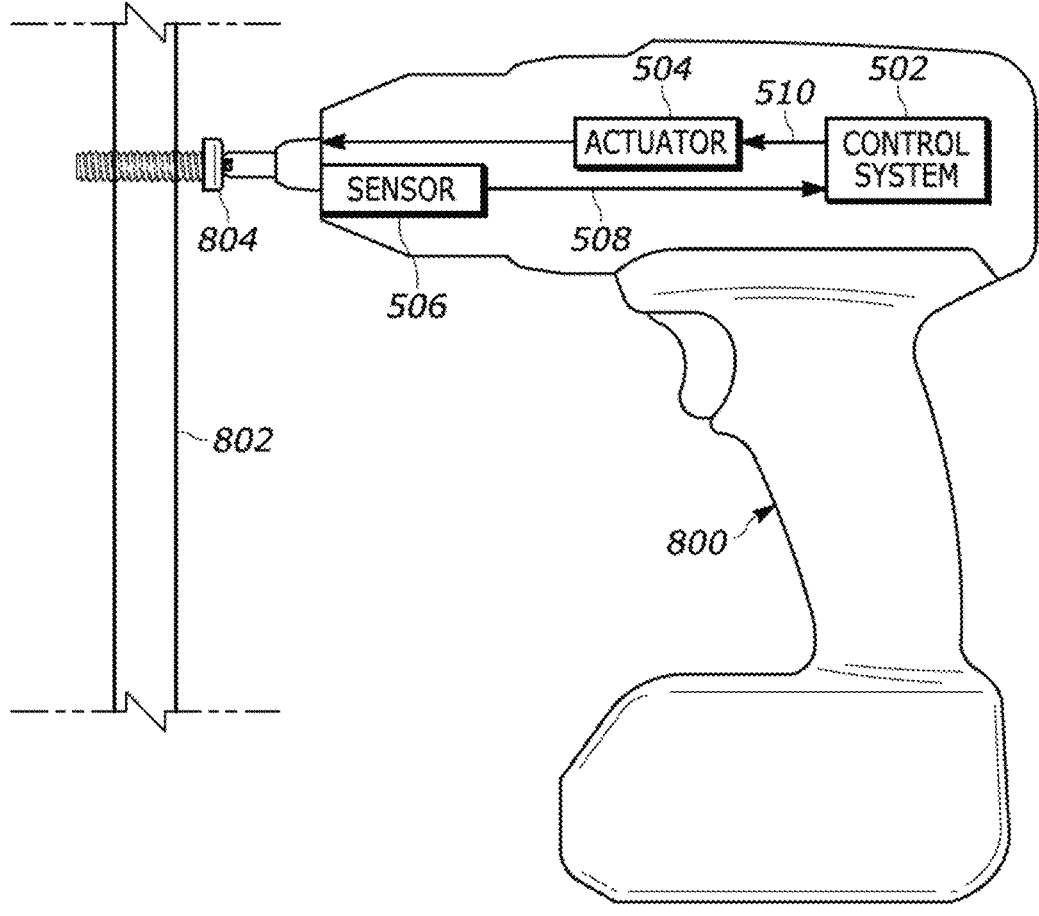
FIG. 8 depicts a schematic diagram of the control system of FIG. 1 configured to control a power tool, such as a power drill or driver, that has an at least partially autonomous mode.

FIG. 8 depicts a schematic diagram of control system 502 configured to control power tool 800, such as a power drill or driver, that has an at least partially autonomous mode. Control system 502 may be configured to control actuator 504, which is configured to control power tool 800.

Sensor 506 of power tool 800 may be an optical sensor configured to capture one or more properties of work surface 802 and/or fastener 804 being driven into work surface 802. Classifier 514 may be configured to determine a state of work surface 802 and/or fastener 804 relative to work surface 802 from one or more of the captured properties. The state may be fastener 804 being flush with work surface 802. The state may alternatively be hardness of work surface 802. Actuator 504 may be configured to control power tool 800 such that the driving function of power tool 800 is adjusted depending on the determined state of fastener 804 relative to work surface 802 or one or more captured properties of work surface 802. For example, actuator 504 may discontinue the driving function if the state of fastener 804 is flush relative to work surface 802. As another non-limiting example, actuator 504 may apply additional or less torque depending on the hardness of work surface 802.

In some embodiments, sensor 506 may be, or may include, a wireless receiver for sensing the presence of wireless signals (e.g., Wi-Fi, Bluetooth signals). In accordance with the discussion elsewhere herein, control system 502 may use the wireless signals sensed by sensor 506 for PID of a particular person. Based on the identification of a particular person, control system 502 and actuator 504 may make one or more adjustments to the operation of power tool.

Figure 9:
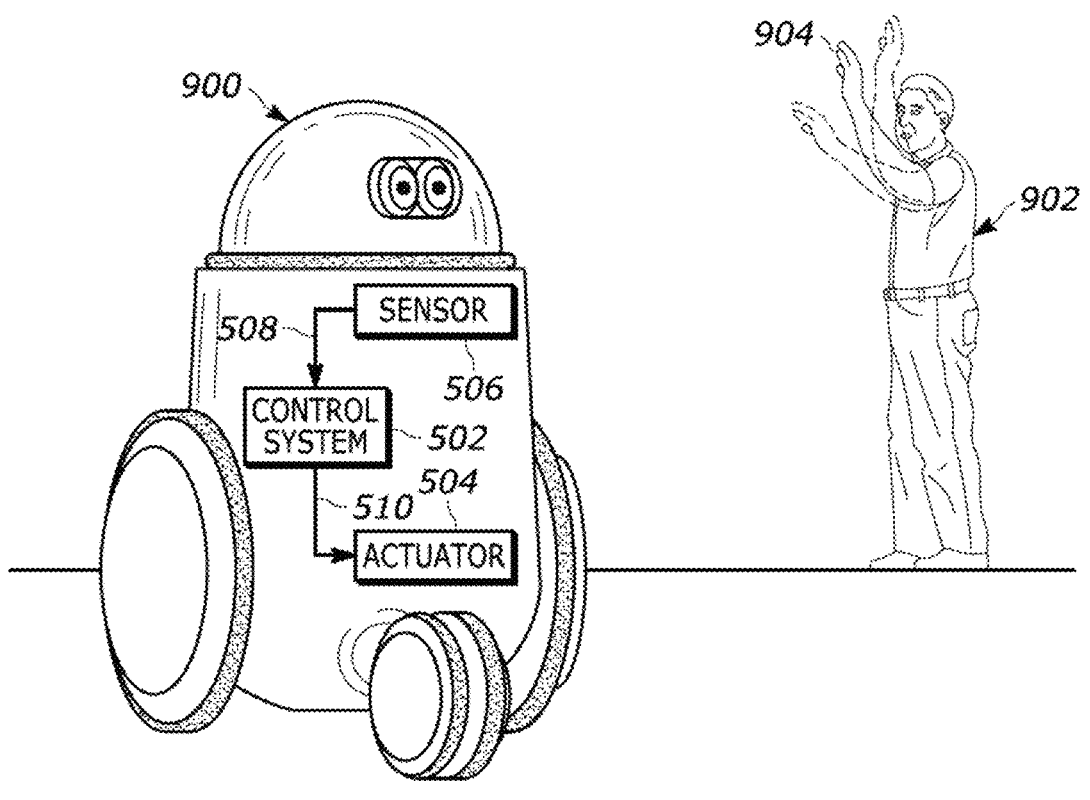
FIG. 9 depicts a schematic diagram of the control system of FIG. 1 configured to control an automated personal assistant.

FIG. 9 depicts a schematic diagram of control system 502 configured to control automated personal assistant 900. Control system 502 may be configured to control actuator 504, which is configured to control automated personal assistant 900. Automated personal assistant 900 may be configured to control a domestic appliance, such as a washing machine, a stove, an oven, a microwave or a dishwasher.

Sensor 506 may be an optical sensor and/or an audio sensor. The optical sensor may be configured to receive video images of gestures 904 of user 902. The audio sensor may be configured to receive a voice command of user 902. Sensor 506 may also, or alternatively, be configured to receive and process wireless signals (e.g., Wi-Fi), while control system 502 may be configured to perform PID in accordance with discussion elsewhere in this disclosure.

Control system 502 of automated personal assistant 900 may be configured to determine actuator control commands 510 configured to control system 502. Control system 502 may be configured to determine actuator control commands 510 in accordance with sensor signals 508 of sensor 506. Automated personal assistant 900 is configured to transmit sensor signals 508 to control system 502. Classifier 514 of control system 502 may be configured to execute a gesture recognition algorithm to identify gesture 904 made by user

902, to determine actuator control commands 510, and to transmit the actuator control commands 510 to actuator 504. Classifier 514 may be configured to retrieve information from non-volatile storage in response to gesture 904 and to output the retrieved information in a form suitable for reception by user 902. In some embodiments, classifier 514 may be configured to identify a particular person using information received by sensor 506, thereby causing control system 502 to adjust operation of automated personal assistant 900 based on the identification.

Figure 10:
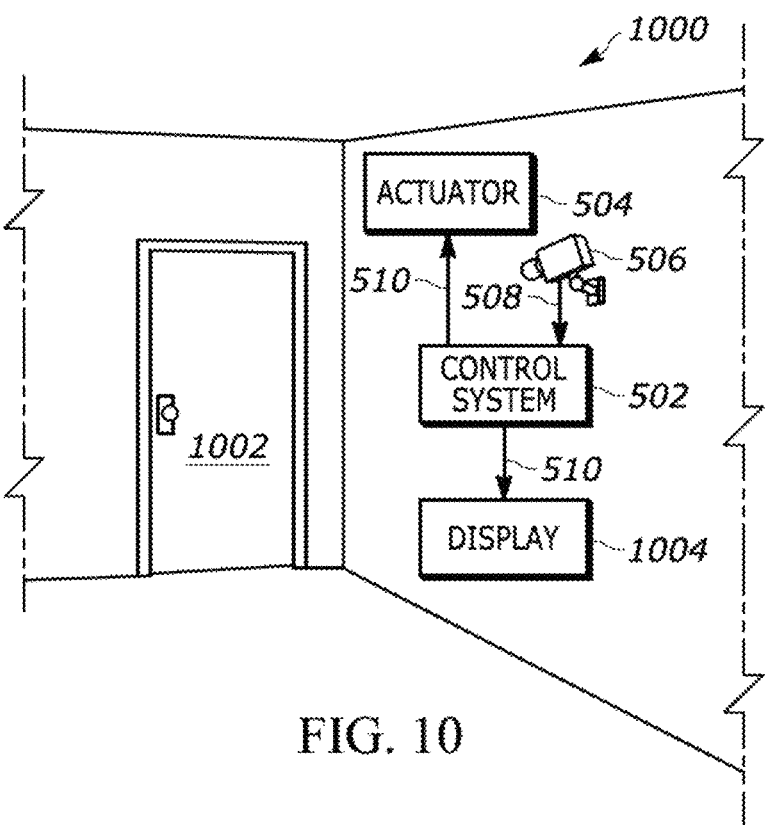
FIG. 10 depicts a schematic diagram of the control system of FIG. 1 configured to control a monitoring system, such as a control access system or a surveillance system.

FIG. 10 depicts a schematic diagram of control system 502 configured to control monitoring system 1000. Monitoring system 1000 may be configured to physically control access through door 1002. Sensor 506 may be configured to detect a scene that is relevant in deciding whether access is granted. Sensor 506 may be an optical sensor configured to generate and transmit image and/or video data. Such data may be used by control system 502 to detect a person's face. In some embodiments, sensor 506 may include (or may alternately be) circuitry for receiving and processing wireless signals, such as Wi-Fi or Bluetooth signals.

Classifier 514 of control system 502 of monitoring system 1000 may be configured to interpret the image and/or video data by matching identities of known people stored in non-volatile storage 516, thereby determining an identity of a person. Classifier 514 may be configured to generate an actuator control command 510 in response to the interpretation of the image and/or video data. Control system 502 is configured to transmit the actuator control command 510 to actuator 504. In this embodiment, actuator 504 may be configured to lock or unlock door 1002 in response to the actuator control command 510. In other embodiments, a non-physical, logical access control is also possible. In some embodiments, classifier 514 may be configured to generate an actuator control command based on identification of a particular person based on wireless signals received by a wireless receiver in sensor 506. For example, classifier 514 may generate a command to cause actuator 504 to adjust a temperature setting for the particular person identified based on wireless signals.

Monitoring system 1000 may also be a surveillance system. In such an embodiment, sensor 506 may be an optical sensor or a wireless receiver and/or a wireless transmitter configured to detect a scene that is under surveillance and control system 502 is configured to control display 1004. Classifier 514 is configured to determine a classification of a scene, e.g. whether the scene detected by sensor 506 is suspicious. Control system 502 is configured to transmit an actuator control command 510 to display 1004 in response to the classification. Display 1004 may be configured to adjust the displayed content in response to the actuator control command 510. For instance, display 1004 may highlight an object that is deemed suspicious by classifier 514. Utilizing an embodiment of the system disclosed, the surveillance system may predict objects at certain times in the future showing up.

Figure 11:
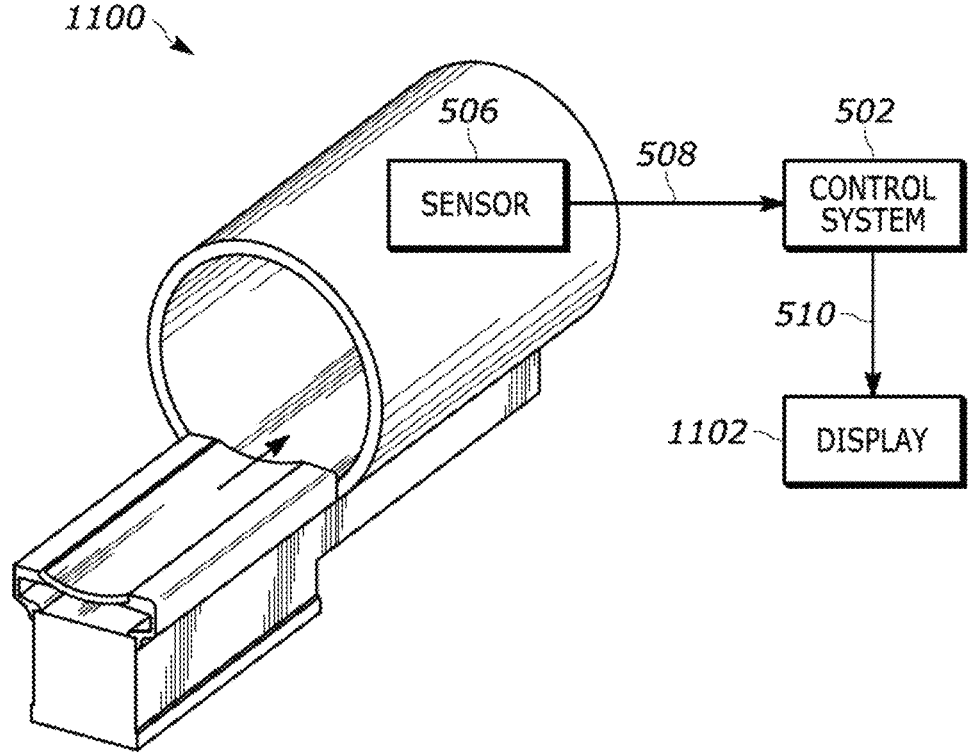
FIG. 11 depicts a schematic diagram of the control system of FIG. 1 configured to control an imaging system, for example an MM apparatus, x-ray imaging apparatus or ultrasonic apparatus.

FIG. 11 depicts a schematic diagram of control system 502 configured to control imaging system 1100, for example a Mill apparatus, x-ray imaging apparatus or ultrasonic apparatus. Sensor 506 may, for example, be an imaging sensor. Classifier 514 may be configured to determine a classification of all or part of the sensed image. Classifier 514 may be configured to determine or select an actuator control command 510 in response to the classification obtained by the trained neural network. For example, classifier 514 may interpret a region of a sensed image to be potentially anomalous. In this case, actuator control command 510 may be determined or selected to cause display 1102 to display the imaging and highlighting the potentially anomalous region.

In various embodiments, sensor 506 may also include circuitry for receiving and processing wireless signals. Classifier 514 may use the wireless signals to identify a particular person. Based on the identification, classifier 514 may cause generation of one or more commands to control imaging system 1100.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method for determining particular personal identity using wireless signals, the method comprising:

collecting, at a wireless receiver, channel state information from received packets transmitted by a wireless transmitter;

pre-processing, using a computer system associated with the wireless receiver, the channel state information, wherein pre-processing the channel state information comprises determining a gait and a plurality of biometric features including body shape and height associated with a particular person based on selected channel state information segments;

annotating, using the computer system, the selected channel state information segments with a class indicative based on the at least the gait of the particular person;

identifying, using a machine learning model, the particular person based on the at least the gait of the particular person, wherein the machine learning model is trained using classifier training and training data comprising information from the selected channel state information segments and the gait of the particular person, and wherein performing the classifier training includes:

determining one or more parameters of the selected channel state information segments;

extracting a plurality of time-domain features to determine a variability of wireless signals of the selected channel state information segments; and extracting a plurality of frequency-domain features to determine spectral bandwidth, spectral flatness, and peak frequency of the wireless signals of the selected channel state information segments including subcarrier correlations;

determining, using the computer system and the machine learning model, one or more usage patterns of a machine by the particular person, wherein the machine is located in a space that includes the wireless receiver and the wireless transmitter;

identifying, using the computer system and the one or more parameters of the selected channel state information segments, a presence of the particular person based on additional packets received by the wireless receiver subsequent to performing classifier training; and controlling, by the computer system and using the one or more usage patterns, operation of the machine in response to detecting the presence of the particular person.

2. The method of claim 1, wherein the pre-processing of the channel state information comprises using amplitude information from the received packets to determine the gait and ones of the plurality of biometric features of a particular person.

3. The method of claim 1, wherein the pre-processing of the channel state information comprises using phase information from the received packets to determine the gait and ones of the plurality of biometric features of a particular person.

4. The method of claim 1, wherein the pre-processing of the channel state information comprises using Doppler frequency shift information from the received packets to determine the gait and motion signature of the particular person.

5. The method of claim 1, wherein performing classifier training of the machine learning model comprises using a two-dimensional convolution neural network to determine the one or more parameters of the selected channel state information segments identifying the particular person.

6. The method of claim 1, wherein performing the classifier training further includes using a sequence model having a bidirectional gated recurrent unit (BiGRU) with an attention mechanism and a transformer.

7. The method of claim 1, wherein performing the classifier training of the machine learning model comprises using a sequence model to determining a temporal pattern of motion of the particular person.

8. The method of claim 1, wherein the machine is a home appliance, and wherein controlling operation of the machine comprises learning one or more user preferences of the particular person.

9. A system for determining particular personal identity using wireless signals, the system comprising:

a wireless receiver configured to receive packets transmitted by a wireless transmitter, and further configured to collect channel state information from the packets; and a computer system associated with the wireless receiver, wherein the computer system is configured to:

pre-process the channel state information, wherein preprocessing the channel state information comprises determining a gait and a plurality of biometric features including body shape and height associated with a particular person based on selected channel state information segments;

annotate the selected channel state information segments with a class indicative based on the at least the gait of the particular person;

identify, using a machine learning model, the particular person based on the at least the gait of the particular person, wherein the machine learning model is trained using classifier training and training data comprising information from the selected channel state information segments and the gait of the particular person, and wherein the computer system is configured to, in performing the classifier training;

determine one or more parameters of the selected channel state information segments;

extract a plurality of time-domain features to determine a variability of wireless signals of the selected channel state information segments; and extract a plurality of frequency-domain features to determine spectral bandwidth, spectral flatness, and peak frequency of the wireless signals of the selected channel state information segments:

determine, using machine learning model, one or more usage patterns of a machine by the particular person, wherein the machine is located in a space that includes the wireless receiver and the wireless transmitter;

identify, using the one or more parameters of the selected channel state information segments, a presence of the particular person based on additional packets received by the wireless receiver subsequent to performing classifier training; and control, using the one or more usage patterns, operation of the machine in response to detecting the presence of the particular person.

10. The system of claim 9, wherein the computer system is configured to use amplitude information from the received packets to determine the gait of the particular person.

11. The system of claim 9, wherein the computer system is configured to use phase information from the received packets to determine the gait of the particular person.

12. The system of claim 9, wherein the computer system is configured to use Doppler frequency shift information from the received packets to determine the gait of the particular person.

13. The system of claim 9, wherein, in performing the classifier training, the computer system is configured to use a two-dimensional convolution neural network to determine the one or more parameters of the selected channel state information segments identifying the particular person.

14. The system of claim 9, wherein, in performing the classifier training, the computer system is configured to determine a temporal pattern of motion of the particular person using a sequence model.

15. The system of claim 9, wherein the machine is a home appliance, and wherein, to control the machine, the computer system is configured to learn one or more user preferences of the particular person.

16. A non-transitory computer-readable medium storing instructions that, when executed by a computer system, cause the computer system to carry out operations comprising:

pre-processing channel state information from packets received at a wireless receiver associated with the computer system, wherein pre-processing the channel state information comprises determining a gait associated with a particular person based on selected channel state information segments;

annotating the selected channel state information segments with a class indicative based on the at least the gait of the particular person;

identifying, using a machine learning model, the particular person based on the at least the gait of the particular person, wherein the machine learning model is trained using classifier training and training data comprising information from the selected channel state information segments and the gait of the particular person, and wherein performing the classifier training includes:

determining one or more parameters of the selected channel state information segments;

extracting a plurality of time-domain features to determine a variability of wireless signals of the selected channel state information segments; and extracting a plurality of frequency-domain features to determine spectral bandwidth, spectral flatness, and peak frequency of the wireless signals of the selected channel state information segments;

determining, using the machine learning model, one or more usage patterns of a machine by the particular person, wherein the machine is located in a space that includes the wireless receiver and a wireless transmitter from which the packets were transmitted;

identifying, using the one or more parameters of the selected channel state information segments, a presence of the particular person based on additional packets received by the wireless receiver subsequent to performing classifier training; and controlling, using the one or more usage patterns, operation of the machine in response to detecting the presence of the particular person.

17. The computer-readable medium of claim 16, wherein the instructions are further executable to use one or more of the following to determine the gait of the particular person:

amplitude information from the received packets;

phase information from the received packets;

Doppler frequency shift information from the received packets.

18. The computer-readable medium of claim 16, wherein the instructions are further executable to determine a temporal pattern of motion of the particular person using a sequence model.

19. The computer-readable medium of claim 16, wherein the machine is a home appliance, and wherein the instructions are further executable to learn one or more user preferences of the particular person.

* * * * *